United States Patent
Scheibenstock

(10) Patent No.: US 12,260,274 B2
(45) Date of Patent: Mar. 25, 2025

(54) METHOD, SYSTEM, COMPUTER PROGRAM AND COMPUTER-READABLE MEDIUM FOR ATTACHING A NUMBER OF UNIQUE IDENTIFICATION CODES FROM A SET OF UNIQUE IDENTIFICATION CODES TO A NUMBER OF OBJECTS

(71) Applicant: SCRIBOS GmbH, Heidelberg (DE)

(72) Inventor: Steffen Scheibenstock, Stuttgart (DE)

(73) Assignee: SCRIBOS GmbH, Heidelberg (DE)

( * ) Notice: Subject to any disclaimer, the term of this patent is extended or adjusted under 35 U.S.C. 154(b) by 0 days.

(21) Appl. No.: 18/028,854

(22) PCT Filed: Oct. 5, 2021

(86) PCT No.: PCT/EP2021/077447
§ 371 (c)(1),
(2) Date: Mar. 28, 2023

(87) PCT Pub. No.: WO2022/078820
PCT Pub. Date: Apr. 21, 2022

(65) Prior Publication Data
US 2023/0334278 A1 Oct. 19, 2023

(30) Foreign Application Priority Data
Oct. 12, 2020 (DE) .................... 10 2020 212 842.1

(51) Int. Cl.
*G06K 19/06* (2006.01)
(52) U.S. Cl.
CPC .............................. *G06K 19/06037* (2013.01)

(58) Field of Classification Search
CPC ......... G06K 19/0609; G06K 19/06018; G06K 19/06028; G06K 19/06037; G06Q 10/087
See application file for complete search history.

(56) References Cited

U.S. PATENT DOCUMENTS

| 4,299,073 A | 11/1981 | Golicz et al. |
| 4,939,674 A * | 7/1990 | Price .................... G06K 1/121 283/37 |

(Continued)

OTHER PUBLICATIONS

International Search Report.
German Search Report.

*Primary Examiner* — Laura A Gudorf
(74) *Attorney, Agent, or Firm* — Hoffmann & Baron, LLP

(57) ABSTRACT

A method for attaching a number of unique identification codes (13) from a set of unique identification codes (13) to a number of objects, wherein the unique identification codes (13) differ from one another, wherein the unique identification codes (13) form a predefined code sequence which defines a first unique identification code (13) and a last unique identification code (13), wherein the method contains the following steps: attaching the number of unique identification codes (13) from the set of unique identification codes (13) to the number of objects, with the result that one unique identification code (13) is attached to each object (5); optically detecting a unique identification code (13) from the set of unique identification codes (13) with the aid of a detection unit (17) and detecting an item of additional information; inferring the attached unique identification codes (13) on the basis of the optically detected unique identification code (13) and the detected item of additional information.

18 Claims, 9 Drawing Sheets

(56) References Cited

U.S. PATENT DOCUMENTS

| | | | |
|---|---|---|---|
| 2005/0234869 A1* | 10/2005 | Massod | G06Q 10/087 |
| 2009/0251294 A1 | 10/2009 | Kawamura et al. | |
| 2010/0019035 A1* | 1/2010 | Larson | G06Q 10/087 |
| | | | 235/439 |
| 2016/0026970 A1* | 1/2016 | Løken | G06Q 50/04 |
| | | | 235/375 |
| 2018/0251252 A1 | 9/2018 | Kawai et al. | |
| 2021/0208822 A1* | 7/2021 | Veenma | G06F 3/1211 |

* cited by examiner

METHOD, SYSTEM, COMPUTER PROGRAM AND COMPUTER-READABLE MEDIUM FOR ATTACHING A NUMBER OF UNIQUE IDENTIFICATION CODES FROM A SET OF UNIQUE IDENTIFICATION CODES TO A NUMBER OF OBJECTS

This application is a National Stage application based on an International Application filed under the Patent Cooperation Treaty, PCT/EP2021/077447, filed Oct. 5, 2021, which claims priority to DE 102020212842.1, filed Oct. 12, 2020.

BACKGROUND OF THE INVENTION

The present invention relates to a method, a system, a computer program and a computer-readable medium for attaching a number of unique identification codes from a set of unique identification codes to a number of objects.

Methods for attaching a number of unique identification codes from a set of unique identification codes to a number of objects are known from the state of the art. In these methods known from the state of the art, the number of unique identification codes from the set of unique identification codes is attached to the number of objects such that, after attaching the unique identification codes, one unique identification code is attached to each object.

In general, it is desirable to easily and quickly determine which unique identification codes are attached to the objects.

SUMMARY OF THE INVENTION

The object of the present invention is therefore to provide an easy and quick determination of which unique identification codes are attached to the objects.

According to a first aspect of the invention, the named object is achieved by a method with the features of claim 1. The method is adapted for attaching a number of unique identification codes from a set of unique identification codes to a number of objects. The unique identification codes differ from one another. The unique identification codes form a predefined code sequence which defines a first unique identification code and a last unique identification code. The method contains the following steps: attaching the number of unique identification codes from the set of unique identification codes to the number of objects, with the result that one unique identification code is attached to each object; optically detecting a unique identification code from the set of unique identification codes with the aid of a detection unit and detecting an item of additional information; inferring the attached unique identification codes on the basis of the optically detected unique identification code and the item of additional information.

The method is adapted for attaching a number of unique identification codes from a set of unique identification codes to a number of objects. The unique identification codes differ from one another. Each identification code from the set of unique identification codes can consist of a character string. The character string can in turn contain letters and/or numerals. Each identification code from the set of unique identification codes is unique and differs due to its uniqueness from other unique identification codes, in particular from the other unique identification codes from the set of unique identification codes. This applies to each of the identification codes, with the result that the unique identification codes differ from one another. In particular, it is provided that no two unique identification codes exist, wherein the two unique identification codes are identical.

Each unique identification code of the unique identification codes can also be referred to as a unique identifier (UID) or unique ID.

Each object of the number of objects is preferably a product, with the result that the number of unique identification codes are attached to a number of products. Alternatively, each object of the number of objects is preferably an item of packaging of a product, with the result that the number of unique identification codes are attached to a number of items of packaging.

The number of unique identification codes preferably corresponds to the set of unique identification codes. In the case that the number of unique identification codes corresponds to the set of unique identification codes, all of the unique identification codes from the set of unique identification codes can be attached to the number of objects. Alternatively, the number of unique identification codes can also be smaller than the set of unique identification codes. In the case that the number of unique identification codes is smaller than the set of unique identification codes, it can be provided that a part of the set of unique identification codes which is not part of the number of unique identification codes is attached to other objects which are not part of the number of objects. In particular, the part of the set of unique identification codes which is not part of the number of unique identification codes can be attached to other objects which are not part of the number of objects—before, after and/or during the attachment of the number of unique identification codes from the set of unique identification codes to the number of objects—with the result that the set of unique identification codes can be attached to the objects in a particularly time-efficient manner.

The number of unique identification codes preferably corresponds to the number of objects. If the number of unique identification codes corresponds to the number of objects, precisely one unique identification code can be provided for each object and precisely one unique identification code can be attached to each object, with the result that the number of unique identification codes for a predefined number of objects can be minimized. A small number of unique identification codes can in particular to make a particularly resource-efficient method possible. A particularly resource-efficient method can for example be provided by applying only one unique identification code to each object. A further possibility for designing the method in a particularly resource-efficient manner is that only one unique identification code has to be optically detected per object. In addition, the method can be particularly resource-efficient as one unique identification code per object has to be stored, transmitted and/or processed. Alternatively, the number of unique identification codes can also be larger than the number of objects. If the number of unique identification codes is larger than the number of objects, at least two unique identification codes can be attached to at least one of the objects.

The unique identification codes form a predefined code sequence which defines a first unique identification code and a last unique identification code. The unique identification codes form a code sequence which defines a first unique identification code and a last unique identification code. The number of unique identification codes preferably comprises at least two unique identification codes, namely the first unique identification code and the last unique identification code. The number of unique identification codes preferably comprises a plurality of unique identification codes, namely the first unique identification code, the last unique identification code and at least one further unique identification code. In particular, it is provided that the code sequence defines at least one further unique identification code between the first unique identification code and the last unique identification code. The code sequence defines the first unique identification code and the last unique identification code. For each unique identification code of the set of unique identification codes, the code sequence preferably defines a position of the unique identification code within the set of unique identification codes, with the result that each unique identification code is assigned a particular position in the code sequence. The first unique identification code can for example occupy the first position in the code sequence. The last unique identification code can for example occupy the last position in the code sequence. In the case that, for example, the number of unique identification codes contains 1000 unique identification codes, the last unique identification code can occupy the thousandth position in the code sequence. The second to nine hundred and ninety-ninth positions are then correspondingly occupied by the at least one further unique identification codes in the code sequence. In particular, the unique identification codes of the set of unique identification codes can be brought into a relationship with one another by the code sequence.

The unique identification codes preferably form the code sequence such that the unique identification codes, by their very content, predefine a sequence which corresponds to the code sequence. For example, the unique identification codes can contain numerals which define a number for each unique identification code and the numbers of the unique identification codes define the code sequence. In the case that the unique identification codes contain numerals which define a number for each unique identification code and the numbers of the unique identification codes define the code sequence, the code sequence can also be referred to as a numerically defined code sequence. Thus, for example in the case that one thousand unique identification codes are provided, the numbers one to one thousand can be provided, wherein each of the unique identification codes contains one of these numbers and the numbers of the unique identification codes differ. For example, the code sequence can be defined by an ascending numerical order of these numbers, with the result that, for example, the unique identification code with the number one can be the first unique identification code and the unique identification code with the number one thousand can be, for example, the last unique identification code. For example, the code sequence can alternatively also be defined by a descending numerical order of these numbers, with the result that, for example, the unique identification code with the number one can be the last unique identification code and the unique identification code with the number one thousand can be, for example, the first unique identification code. For example, the unique identification codes can contain letters and numerals which define a character string for each unique identification code and the character strings of the unique identification codes define the code sequence. In the case that the unique identification codes contain letters and numerals which define a character string for each unique identification code and the character strings of the unique identification codes define the code sequence, the code sequence can also be referred to as an alphanumerically defined code sequence.

As an alternative to the fact that the unique identification codes form the code sequence such that the unique identification codes, by their very content, predefine a sequence which corresponds to the code sequence, the unique identification codes can also form the code sequence such that the unique identification codes form the code sequence independently of their very content. For example, the unique identification codes can form the code sequence such that the unique identification codes within the code sequence are not sorted numerically or alphanumerically. Even if the unique identification codes form the code sequence such that the unique identification codes within the code sequence are not sorted numerically or alphanumerically, the positions of the unique identification codes within the code sequence can be stored in the central processing unit and thus predefine the code sequence. To an observer of the unique identification codes the code sequence can appear random or arbitrary, but items of information which define the code sequence can be stored in the central processing unit and thus predefine the code sequence.

As already described, the code sequence is predefined. In particular, because the code sequence is predefined it is guaranteed that the code sequence can already be specified before attaching the number of unique identification codes to the number of objects. In particular, it is provided that items of information representing the code sequence are stored in a central processing unit, in particular already before attaching the number of unique identification codes to the number of objects, with the result that the code sequence can be predefined in particular by its storage in the central processing unit. For example, the unique identification codes of the set of unique identification codes can, together with positions of the unique identification codes within the code sequence, be stored in the central processing unit, wherein each unique identification code is assigned a particular position in the code sequence and this assignment is also stored in the central processing unit. Thus, for each unique identification code the corresponding position of the unique identification code within the code sequence can be inferred.

The method contains the following step: attaching the number of unique identification codes from the set of unique identification codes to the number of objects, with the result that one unique identification code is attached to each object. The unique identification codes of the number of unique identification codes are therefore attached to the number of objects, with the result that after attaching the unique identification codes of the number of unique identification codes these can also be referred to as attached unique identification codes. As the unique identification codes form the code sequence, each attached unique identification code can be assigned a position within the code sequence. For example, the attached unique identification codes can contain a first attached unique identification code which is positioned within the code sequence such that, of the attached unique identification codes, it is the one which is positioned closest to the first unique identification code, or even matches it, within the code sequence. Further, the attached unique identification codes can for example contain a last attached unique identification code which is positioned within the code sequence such that, of the attached unique identification codes, it is the one which is positioned closest to the last unique identification code, or even matches it, within the code sequence. In particular, the first attached unique identification code and the second attached unique identification code relate to the position thereof within the code sequence and not necessarily to the sequence in which the attached unique identification codes were attached to the objects. For example, the unique identification codes can namely be attached to the objects one after the other in a sequence corresponding to the predefined code sequence. This is advantageous, for example, when a number of labels is provided from a set of labels and each label of the set of labels contains a unique identification code of the set of unique identification codes and the labels are labels of a label roll and are arranged corresponding to the code sequence, with the result that the labels can be taken from the label roll one after the other corresponding to the code sequence and can be attached to the objects in the code sequence. Alternatively, however, it is also possible, for example, for the unique identification codes to be attached to the objects one after the other in a sequence not corresponding to the predefined code sequence. In the case that the unique identification codes are attached to the objects one after the other in a sequence corresponding to the predefined code sequence, the first attached unique identification code is the unique identification code actually attached first and the last attached unique identification code is the unique identification code actually attached last. In the case that the unique identification codes are attached to the objects one after the other in a sequence not corresponding to the predefined code sequence, the first attached unique identification code is not necessarily the unique identification code actually attached first and the last attached unique identification code is not necessarily the unique identification code actually attached last.

The unique identification codes of the number of unique identification codes preferably form neighboring unique identification codes within the code sequence. In the case that the unique identification codes of the number of unique identification codes form neighboring unique identification codes within the code sequence, the total number of the attached unique identification codes can be easily inferred on the basis of the position of the first attached unique identification code and the position of the last attached unique identification code.

Because each unique identification code is unique and the unique identification codes differ from one another, the identity of the object to which the corresponding unique identification code is attached can be inferred on the basis of each attached unique identification code. In particular, because each unique identification code is unique and the unique identification codes differ from one another, each object to which the corresponding unique identification code is attached can be differentiated from other objects which may possibly look identical or similar on the basis of each attached unique identification code.

As already described, the number of unique identification codes from the set of unique identification codes is attached to the number of objects such that one unique identification code is attached to each object. A set of security fields with a number of security fields is preferably provided, wherein the number of security fields is attached to the number of objects such that one security field is attached to each object. Thus, both a unique identification code and a security field can be attached to each object. The unique identification code and the security field are preferably arranged on each object such that the unique identification code and the security field can be jointly, preferably simultaneously, optically detected by the detection unit.

Each security field of the set of security fields preferably contains an information field with a structure with which a first security code is encoded, wherein the first security code can only be decoded from the structure if the latter is produced with a minimum resolution. In particular, the structure is a two-dimensional representation which is arranged such that, when the security field is optically detected, the two-dimensional representation is also optically detected. The two-dimensional representation of the structure can contain a Fourier pattern or be formed from one. In particular, it is provided that the structure itself is not a QR code, DataMatrix, Cool-Data-Matrix, Aztec, UPCode, Trillcode, QuickMark, ShotCode, mCode or BeeTagg. In particular embodiment examples, the structure can instead form a portion of a QR code, DataMatrix, Cool-Data-Matrix, Aztec, UPCode, Trillcode, QuickMark, ShotCode, mCode or BeeTagg. The structure can also be referred to as a security structure. A first security code is preferably encoded with the structure. By detecting the structure and decoding the detected structure the first security code can thus be determined. The first security code of a particular security field preferably differs from the first security codes of other security fields. The first security code thus differs in particular from other first security codes. In particular, the first security codes differ from one another. In particular, it is provided that no two structures exist with which in each case a first security code is encoded, wherein the two first security codes are identical. Because the first security code differs from other first security codes, the first security code is unique. Due to the uniqueness of the first security code, the identity of each object can be inferred on the basis of the first security code. In particular, because the first security code is unique, the object to which the first security code is attached can be differentiated from other objects which may possibly look identical or similar on the basis of the first security code. The first security code is encoded with the structure and is thus present in encoded form, wherein the structure represents this encoded form. Because the first security code is encoded, an observer of the structure cannot necessarily infer the first security code without technical aids, such as for example the detection unit and/or an evaluation unit. In particular, it is advantageous if the structure is formed such that an observer of the structure cannot infer the first security code without technical aids. If the observer cannot, in particular cannot necessarily, infer the first security code without technical aids, it is guaranteed that a replication of the first security code on the object is made much more difficult or even prevented.

The first security code can only be decoded from the structure if the latter is produced with a minimum resolution. The production of the structure can also be referred to as generation of the structure. In particular, the structure is so fine that, in particular for the production thereof, a minimum resolution is necessary so that the structure can be represented such that the first security code can be decoded from the structure. The structure can be formed as a Fourier pattern. The minimum resolution with which the structure is produced is preferably 300 dpi. In particular, it has proved to be advantageous if the minimum resolution is greater than 300 dpi. It is even more advantageous if the minimum resolution with which the structure is produced is 600 dpi. It is even more advantageous if the minimum resolution with which the structure is produced is greater than 600 dpi. It is even more advantageous if the minimum resolution with which the structure is produced is 800 dpi. It is even more advantageous if the minimum resolution with which the structure is produced is greater than 800 dpi. As the minimum resolution with which the structure is produced increases, the protection of the structure against a replication of the structure increases, since as the minimum resolution increases in particular the structure is more difficult to produce, with the result that after production the latter is formed such that the first security code can be decoded from the structure. Further, in particular in an attempt to copy the structure it is altered or, more precisely in the attempt to reproduce it, distorted such that, in particular after a fresh production, a fresh decoding is no longer possible. In particular in the case that the structure is formed as a Fourier pattern, a high minimum resolution guarantees protection against copying, namely such that the structure, after it has been optically detected, such as for example by scanning or photographing, and optionally after reproduction of the structure by, for example, printing out the structure with a standard printer, is no longer readable in the sense that the first security code cannot be decoded from the reproduced structure. It can then be inferred that the reproduced structure is a copy of the structure and can thus also be inferred that for example the security field, and possibly the object to which the security field is attached, is an unauthorized copy of a security field with the structure, which was optically detected for the copying process. In summary, it can be established that, because the first security code can only be decoded from the structure if the latter is produced with a minimum resolution, a protection against copying can be provided for the security field. In particular, because the first security code can only be decoded from the structure if the latter is produced with a minimum resolution, it can be guaranteed that a reproduced structure can be inferred from an original structure.

Further, it is preferred for each security field of the set of security fields to contain a hologram with a second security code. Each security field of the set of security fields can—in addition or as an alternative to the fact that each security field of the set of security fields contains the information field with the structure—contain the hologram with the second security code. The second security code of a particular security field preferably differs from the second security codes of other security fields. The second security code thus differs in particular from other second security codes. In particular, the second security codes differ from one another. In particular, it is provided that no two holograms with in each case a second security code exist, wherein the two second security codes are identical. Because the second security code differs from other second security codes, the second security code is unique. Due to the uniqueness of the second security code, the identity of each object can be inferred on the basis of the second security code. In particular, because the second security code is unique, the object to which the second security code is attached can be differentiated from other objects which may possibly look identical or similar on the basis of the second security code. As already described, the unique identification codes differ from one another. Further, as also already described, in the case that first security codes are provided, it is preferred for the first security codes to differ from one another. In addition, as also already described, in the case that second security codes are provided, it is preferred for the second security codes to differ from one another. In the case that first security codes are provided, it is preferably provided that, for each object of the number of objects, it is necessary that the unique identification code attached to a particular object corresponds to the first security code attached to this object—with the aid of the structure—i.e. that the unique identification code attached to the object and the first security code attached to this object represent the same code (for example "0001"). Further, in the case that second security codes are provided, it is preferably provided that, for each object of the number of objects, it is necessary that the unique identification code attached to a particular object corresponds to the second security code attached to this object—with the aid of the hologram—i.e. that the unique identification code attached to the object and the second security code attached to this object represent the same code (for example "0001").

For example, the first security codes and/or the second security codes can be stored in the central processing unit in addition to the unique identification codes. In particular, each unique identification code can be assigned a first security code and/or a second security code and the corresponding assignment can also be stored in the central processing unit. Thus, for each unique identification code, a first security code and/or second security code attached to the same object can be, in particular optically, detected, in particular with the aid of the detection unit, and transmitted to the central processing unit. In the central processing unit it can then be inferred, on the basis of the assignment of unique identification codes and first security codes and/or second security codes stored in the central processing unit, in particular for each unique identification code, whether the detected first security code and/or the detected second security code corresponds to the first security codes and/or second security code assigned to a particular unique identification code and, if this is the case, it can be inferred that the unique identification code is a unique identification code that has not been copied in an unauthorized manner. A protection against copying can thus be provided for the unique identification code with the aid of the first security code and/or the second security code. In particular, a protection against copying can be provided for the unique identification codes with the aid of the first security codes and/or the second security codes.

Further, the method contains the following step: optically detecting a unique identification code from the set of unique identification codes with the aid of a detection unit and detecting an item of additional information. Because the unique identification code from the set of unique identification codes is optically detected with the aid of a detection unit, the optically detected unique identification code can be used for the further analysis. In particular, it is provided that the optical detection comprises a scanning or photographing. The detection unit is preferably a detection unit of a mobile telephone, such as for example a camera, in particular a digital camera, of the mobile telephone. Because the item of additional information is detected, the detected item of additional information, together with the optically detected unique identification code, can be used for the further analysis. The detection of the item of additional information preferably comprises an optical detection with the aid of the detection unit, with the result that both the unique identification code and the item of additional information are preferably jointly, particularly preferably simultaneously, optically detected with the aid of the detection unit. A joint, preferably simultaneous, optical detection makes it possible to provide a particularly easy and time-efficient method, wherein the simultaneous optical detection provides a particularly time-efficient variant of the method. As an alternative to the fact that the detection of the item of additional information comprises an optical detection with the aid of the detection unit, the detection of the item of additional information can also contain a manual detection. For example, a user of the mobile telephone can manually input the item of additional information, for example, via a user interface of the mobile telephone.

The item of additional information preferably comprises a further unique identification code from the set of unique identification codes. Alternatively or additionally, the item of additional information can also comprise the position of the optically detected unique identification code relative to the first attached unique identification code and/or to the last attached unique identification code in the predefined code sequence. It can also alternatively or additionally be provided that the item of additional information comprise the position of the further unique identification code from the set of unique identification codes relative to the first attached unique identification code and/or to the last attached unique identification code in the predefined code sequence. In each of these combinations, the detected item of additional information, together with the optically detected unique identification code, is suitable for inferring the attached unique identification codes. For example, in the case that the item of additional information contains the further unique identification code from the set of unique identification codes, it can be predefined that in the optical detection of the unique identification code the first attached unique identification code is optically detected and in the detection of the item of additional information the last attached unique identification code is detected, with the result that the first attached unique identification code corresponds to the optically detected unique identification code and the last attached unique identification code corresponds to the detected further unique identification code. In each case, the detected item of additional information, together with the optically detected unique identification code, can guarantee that the attached unique identification codes are inferred.

Further, the method contains the following step: inferring the attached unique identification codes on the basis of the optically detected unique identification code and the detected item of additional information. In particular, because the unique identification codes form the predefined code sequence, the attached unique identification codes can be inferred on the basis of the optically detected unique identification code and the detected item of additional information. By inferring the attached unique identification codes on the basis of the optically detected unique identification code and the detected item of additional information, inferring the attached unique identification codes is made much easier and quicker, in particular compared with an optical detection of each individual attached unique identification code. Inferring the attached unique identification codes on the basis of the optically detected unique identification code and the detected item of additional information can for example be guaranteed in that, on the basis of the optically detected unique identification code and on the basis of the detected item of additional information, the position of the first attached unique identification code within the code sequence and the number of attached unique identification codes are determined and, on the basis of this information, the positions of the attached unique identification codes within the code sequence and the attached unique identification codes themselves are inferred. Further, inferring the attached unique identification codes on the basis of the optically detected unique identification code and the detected item of additional information can for example be guaranteed in that, on the basis of the optically detected unique identification code and on the basis of the detected item of additional information, the position of the last attached unique identification code within the code sequence and the number of attached unique identification codes are determined and, on the basis of this information, the positions of the attached unique identification codes within the code sequence and the attached unique identification codes themselves are inferred. In addition, inferring the attached unique identification codes on the basis of the optically detected unique identification code and the detected item of additional information can for example be guaranteed in that, on the basis of the optically detected unique identification code and on the basis of the detected item of additional information, the position of the first attached unique identification code within the code sequence and the position of the last attached unique identification code within the code sequence are determined and, on the basis of this information, the positions of the attached unique identification codes within the code sequence and the attached unique identification codes themselves are inferred.

In summary, it can therefore be established that the present invention provides an easy and quick determination of which unique identification codes are attached to the objects.

In an embodiment, the detection of the item of additional information comprises an optical detection of a further unique identification code from the set of unique identification codes. For example, in the case that the item of additional information contains the further unique identification code from the set of unique identification codes, it can be predefined that in the optical detection of the unique identification code the first attached unique identification code is optically detected and in the detection of the item of additional information the last attached unique identification code is detected, with the result that the first attached unique identification code corresponds to the optically detected unique identification code and the last attached unique identification code corresponds to the detected further unique identification code. As a result, a particularly easy and particularly quick determination of which unique identification codes are attached to the objects is provided, as in particular the unique identification codes arranged between the first attached unique identification code and the last attached unique identification code within the code sequence can be accessed when inferring the attached unique identification codes. This is in particular preferred when the unique identification codes of the number of unique identification codes form neighboring unique identification codes within the code sequence.

In an embodiment, the detection of the item of additional information comprises a detection of the position of the optically detected unique identification code relative to the first attached unique identification code and to the last attached unique identification code in the predefined code sequence. In the case that the detection of the item of additional information comprises a detection of the position of the optically detected unique identification code relative to the first attached unique identification code and to the last attached unique identification code in the predefined code sequence, the attached unique identification codes can be inferred with the aid of a single optically detected unique identification code without further unique identification codes beyond the unique identification code having to be optically detected. The item of additional information is preferably attached to the same object to which the unique identification code which is optically detected is also attached, with the result that the item of additional information and the unique identification code can be jointly, preferably simultaneously, optically detected by the detection unit. A joint, preferably simultaneous, detection of the item of additional information and the unique identification code provides a particularly time-efficient method, as the item of additional information and the unique identification code can be detected in a short period of time, in particular compared with the case that more than one unique identification code has to be detected. Thus, the attached unique identification codes can be inferred on the basis of the optically detected unique identification code and the detected item of additional information with a particularly low expenditure of time. In particular, the attached unique identification codes can be inferred with the aid of the relative positions irrespective of whether the optically detected unique identification code is part of the attached unique identification codes.

In an embodiment, the detection of the item of additional information comprises a detection of the position of the optically detected unique identification code relative to the first attached unique identification code in the predefined code sequence and a detection of the position of the optically detected further unique identification code relative to the last attached unique identification code in the predefined code sequence. For example, the position of the optically detected unique identification code relative to the first attached unique identification code in the predefined code sequence can indicate that the first attached unique identification code corresponds to the optically detected unique identification code. Alternatively, the position of the optically detected unique identification code relative to the first attached unique identification code in the predefined code sequence can indicate that the first attached unique identification code is arranged in a particular number of positions within the code sequence before or after the optically detected unique identification codes. Further, the position of the optically detected further unique identification code relative to the last attached unique identification code in the predefined code sequence can, for example, indicate that the last attached unique identification code corresponds to the optically detected further unique identification code. Alternatively, the position of the optically detected further unique identification code relative to the last attached unique identification code in the predefined code sequence can indicate that the last attached unique identification code is arranged in a particular number of positions within the code sequence before or after the optically detected further unique identification codes. Through the detection of the position of the optically detected unique identification code relative to the first attached unique identification code in the predefined code sequence and a detection of the position of the optically detected further unique identification code relative to the last attached unique identification code in the predefined code sequence, the attached unique identification codes can be inferred via the assignment of the unique identification codes to the positions thereof within the code sequence. With the aid of the relative positions, the attached unique identification codes can be inferred irrespective of whether the optically detected unique identification code and the optically detected further unique identification code part of the attached unique identification codes.

In an embodiment, a number of labels is provided from a set of labels, wherein each label of the set of labels contains a unique identification code of the set of unique identification codes, wherein the set of labels forms a predefined label sequence, wherein the label sequence corresponds to the code sequence, with the result that, in the label sequence, a first label is provided with the first unique identification code and a last label is provided with the last unique identification code, wherein the attachment of the number of unique identification codes from the set of unique identification codes to the number of objects comprises an attachment of the number of labels from the set of labels to the number of objects, with the result that one label is attached to each object, wherein the optical detection of the unique identification code from the set of unique identification codes comprises an optical detection of a label from the set of labels with the aid of the detection unit, with the result that the unique identification code of the optically detected label is detected. Because each label of the set of labels contains a unique identification code of the set of unique identification codes, the unique identification codes can be attached to the objects with the aid of the labels. In the case that a label of the number of labels is damaged when the labels are attached to the objects, it can be provided that the damaged label is replaced with another label of the number of labels and is attached to the object instead of the damaged label or in addition to the damaged label. Further, it can be provided for this case that, for example with the aid of the detection unit, the unique identification code of the damaged label is detected as a defective identification code and the defective identification code is taken into consideration when inferring the attached unique identification codes. Further, in the case that several labels of the number of labels are damaged when the labels are attached to the objects, it can be provided that each of the damaged labels is replaced with another label of the number of labels and is attached to the corresponding object instead of each damaged label or in addition to each damaged label. Further, it can be provided for this case that, for example with the aid of the detection unit, the unique identification codes of the damaged labels are detected as defective identification codes and the defective identification codes are taken into consideration when inferring the attached unique identification codes. For example, it can also be provided that, with the aid of the detection unit, the number of defective identification codes is detected and this number is taken into consideration when inferring the attached unique identification codes.

In an embodiment, the method also contains the following step: storing the optically detected unique identification code and the item of additional information in the detection unit. The storage of the optically detected unique identification code and the item of additional information in the detection unit guarantees operation of the detection unit even when it is in an offline state, in which the detection unit cannot send data which represent the optically detected unique identification code and the item of additional information to the central processing unit via a communication interface.

In an embodiment, the method also contains the following step: transmitting the optically detected unique identification code and the item of additional information to a central processing unit. The transmission of the optically detected unique identification code and the item of additional information to a central processing unit has the advantage that the transmitted optically detected unique identification code and the transmitted item of additional information can be utilized in the central processing unit for further evaluations, such as for example inferring the attached unique identification codes on the basis of the optically detected unique identification code and the detected item of additional information. The transmission of the optically detected unique identification code and the item of additional information to the central processing unit can be provided by sending data which represent the optically detected unique identification code and the item of additional information to the central processing unit via a communication interface. In particular, the transmission can be effected here, at least in portions, wirelessly or by wire. In particular, it is provided that the attached unique identification codes are inferred on the basis of the optically detected unique identification code and the detected item of additional information after transmitting the optically detected unique identification code and the item of additional information to the central processing unit. In this case, the attached unique identification codes are preferably inferred in the central processing unit. Here, the unique identification codes of the set of unique identification codes, together with positions of the unique identification codes within the code sequence, can for example be stored in the central processing unit, wherein each unique identification code is assigned a particular position in the code sequence and this assignment is also stored in the central processing unit. Further, it can be provided that the attached unique identification codes are inferred on the basis of the optically detected unique identification code and the detected item of additional information before transmitting the optically detected unique identification code and the item of additional information to the central processing unit. In this case, the attached unique identification codes are preferably inferred in the detection unit. Here, the unique identification codes of the set of unique identification codes, together with positions of the unique identification codes within the code sequence, can for example be stored in the detection unit, wherein each unique identification code is assigned a particular position in the code sequence and this assignment is also stored in the detection unit. For example, the unique identification codes, the positions of the unique identification codes within the code sequence and the assignment of the positions within the code sequence to the unique identification codes can be sent from the central processing unit to the detection unit.

In an embodiment, the optically detected unique identification code from the set of unique identification codes is provided after the last attached unique identification code in the predefined code sequence. If the optically detected unique identification code from the set of unique identification codes is provided after the last attached unique identification code in the predefined code sequence, the number of unique identification codes can be attached to the objects and a unique identification code, which is not attached to an object, can be optically detected and the attached unique identification codes can be inferred on the basis of this unique identification code which is not attached. Thus, for example, the unique identification codes can be attached to the objects, whereupon the objects can be packaged with the aid of an item of object packaging and only after the objects are packaged in the item of object packaging, which can conceal the attached unique identification codes, can the optical detection of the unique identification code be carried out. As a result, a time-efficient method can in particular be provided when the objects are packaged with items of object packaging immediately after attaching the unique identification codes. As the optically detected unique identification code is provided after the last attached unique identification code in the predefined code sequence, the unique identification codes provided before the optically detected unique identification code can in particular then be attached to the objects first and the unique identification code that is not attached can then be detected when the unique identification codes are attached to the objects in a sequence corresponding to the code sequence. For example, the unique identification code which is optically detected can be located on a label roll from which labels were used for attaching the unique identification codes.

In an embodiment, the optically detected unique identification code from the set of unique identification codes is provided before the first attached unique identification code in the predefined code sequence. If the optically detected unique identification code from the set of unique identification codes is provided before the first attached unique identification code in the predefined code sequence, the number of unique identification codes can be attached to the objects and a unique identification code, which is not attached to an object, can be optically detected and the attached unique identification codes can be inferred on the basis of this unique identification code which is not attached. Thus, for example, an already used unique identification code, which is part of the set of unique identification codes, but is not part of the number of unique identification codes, can first of all be optically detected. The already used unique identification code can be, for example, a last attached unique identification code, which belongs to another number of unique identification codes, preferably before the number of unique identification codes in the code sequence. The unique identification codes can then, for example, be attached to the objects, whereupon the objects can be packaged with the aid of an item of object packaging. Thus, the optical detection of the unique identification code can already be carried out before the objects are packaged in the item of object packaging, which can conceal the attached unique identification codes. As a result, a time-efficient method can in particular be provided when the objects are packaged with items of object packaging immediately after attaching the unique identification codes. As the optically detected unique identification code is provided before the first attached unique identification code in the predefined code sequence, the unique identification codes provided after the optically detected unique identification code can in particular then be attached to the objects and after the optically detected unique identification code is detected when the unique identification codes are attached to the objects in a sequence corresponding to the code sequence.

In an embodiment, the optically detected unique identification code from the set of unique identification codes corresponds to the last attached unique identification code in the predefined code sequence. If the optically detected unique identification code from the set of unique identification codes corresponds to the last attached unique identification code in the predefined code sequence, the number of unique identification codes can correspond to the last unique identification codes of the set of unique identification codes within the code sequence. Thus, a particularly resource-efficient method is provided, as all of the unique identification codes of the set of unique identification codes can be used in the method according to the invention.

In an embodiment, the optically detected unique identification code from the set of unique identification codes corresponds to the first attached unique identification code in the predefined code sequence. If the optically detected unique identification code from the set of unique identification codes corresponds to the first attached unique identification code in the predefined code sequence, the number of unique identification codes can correspond to the first unique identification codes of the set of unique identification codes within the code sequence. Thus, a particularly resource-efficient method is provided, as all of the unique identification codes of the set of unique identification codes can be used in the method according to the invention.

In an embodiment, the number of objects are assigned object-related data, wherein the method also contains the following steps: detecting the object-related data and transmitting the object-related data to the central processing unit. The object-related data preferably represent one or more properties of the objects of the number of objects. Properties of the number of objects can be, for example, that the object is a product or an item of packaging. The object-related data can therefore contain a detail from which it can be concluded that the objects of the number of objects are products or items of product packaging. In particular, the object-related data can—in addition or as an alternative to the one or more properties of the objects—also represent items of information which are related to the objects. These items of information can be, for example, a date, a time, a production line identifier, and/or a batch number. For example, the object-related data can represent a production date and/or production time of an object or all objects of the number of objects. Alternatively or additionally, the object-related data can, for example, represent a production line identifier, which defines a particular production line on which the object or objects were produced or are to be packaged or on which the number of unique identification codes were attached or are to be attached to the number of objects. Alternatively or additionally, the object-related data can, for example, represent a batch number, which is identical, for example, for objects which were produced on the same day.

In particular, it is provided that the object-related data are attached to the objects in the form of a first two-dimensional representation. For example, the object-related data can be attached to the objects before, during or after the number of unique identification codes is attached to the number of objects. The object-related data, or at least a part hereof, can be attached to the objects in the form of a first two-dimensional representation, with the result that a first two-dimensional representation representing the object-related data is attached to each object. In the case that the objects are packaged with the aid of an item of object packaging, the object-related data can additionally or alternatively be attached to the item of object packaging in the form of a second two-dimensional representation, with the result that the second two-dimensional representation representing the object-related data, or at least a part hereof, is attached to the item of object packaging. In particular, it can be provided that a first part of the object-related data is/has been attached to the objects in the form of the first two-dimensional representation and that a second part of the object-related data is/has been attached to the item of object packaging in the form of the second two-dimensional representation. In particular, it is provided here that the first part and the second part differs from one another.

In the case that the object-related data, or at least a part hereof, are additionally or alternatively attached to the item of object packaging in the form of a second two-dimensional representation, the one unique identification code from the set of unique identification codes can, for example, be detected with the aid of the detection unit, the item of additional information can be detected with the aid of the detection unit and the second two-dimensional representation attached to the item of object packaging can be detected with the aid of the detection unit. The unique identification code detected with the aid of the detection unit, the item of additional information detected with the aid of the detection unit and the object-related data determined from the second two-dimensional representation can then be transmitted to the central processing unit and stored in it. An assignment between the unique identification codes, items of additional information and object-related data can also be stored in the central processing unit, with the result that each unique identification code is assigned an item of additional information and object-related data.

For example, the number of objects can contain six wine bottles and the item of object packaging can contain a shipping box. One unique identification code from the set of unique identification codes is attached to each wine bottle. The second two-dimensional representation, which represents a unique shipping box identification code which is an example of a unique object packaging identification code, is attached to the shipping box. The unique shipping box identification code here differs from other unique shipping box identification codes attached to other shipping boxes. The first attached unique identification code and the last attached unique identification code (as a component of the item of additional information) are optically detected with the aid of the detection unit. In addition, the second two-dimensional representation representing the unique shipping box identification code is optically detected with the aid of the detection unit. Which shipping box a particular wine bottle is located in can be inferred on the basis of the unique shipping box identification code.

As already described with reference to an example, the objects can be packaged with the aid of an item of object packaging. In particular, it is advantageous if the objects can be packaged with the aid of several items of object packaging, with the result that the objects are divided into groups, wherein each group can be packaged in one item of object packaging of the items of object packaging. In this case, it can be provided that, in addition to the fact that the number of unique identification codes from the set of unique identification codes is attached to the number of objects such that one unique identification code is attached to each object, one unique object packaging identification code of unique object packaging identification codes is attached to each item of object packaging of the items of object packaging. The unique object packaging identification codes preferably differ, with the result that a particular item of object packaging can be inferred on the basis of a unique object packaging identification code. For each group, the first attached unique identification code of the group and the last attached unique identification code (as a component of the item of additional information) of the group can be optically detected with the aid of the detection unit. In addition, for each group, the unique object packaging identification code, which is attached to the item of object packaging with the aid of which the objects of the group are packaged, can be optically detected with the aid of the detection unit. For each group, the optically detected first attached unique identification code of the group, the optically detected last attached unique identification code (as a component of the item of additional information) and the optically detected unique object packaging identification code can then be transmitted to the central processing unit and stored in it. Which item of object packaging a particular object or a particular group is located in can be inferred on the basis of the unique object packaging identification code.

The object-related data are preferably detected with the aid of the detection unit. In particular, the object-related data, after they have been transmitted to the central processing unit, can be stored in it and assigned to the unique identification codes. For example, the object-related data can be stored in the central processing unit, wherein each unique identification code of the number of unique identification codes is assigned the object-related data and this assignment is also stored in the central processing unit. Thus, for each unique identification code the object-related data can be inferred. For example, when the object-related data are stored in the central processing unit and each unique identification code of the number of unique identification codes is assigned the object-related data, a particular unique identification code can be optically detected and the object-related data assigned to the optically detected unique identification code in the central processing unit can then be inferred on the basis of the optically detected unique identification code.

In an embodiment, the detection of the object-related data contains an optical detection. The object-related data are preferably optically detected with the aid of the detection unit. The optically detected object-related data can be used for the further analysis, for example by transmitting them to the central processing unit, storing them there and assigning them to the unique identification codes. In particular, it is provided that the optical detection comprises a scanning or photographing.

In an embodiment, the detection of the object-related data contains a manual detection. The object-related data are preferably manually detected with the aid of the detection unit. The manually detected object-related data can be used for the further analysis, for example by transmitting them to the central processing unit, storing them there and assigning them to the unique identification codes. In particular, it is provided that the manual detection comprises an inputting of the object-related data via a user interface of the detection unit by a user of the detection unit.

The optically detected object-related data are preferably checked for their plausibility in a plausibility check, in particular before they are stored in the central processing unit or already before they are transmitted to the central processing unit. The plausibility check can be carried out in the detection unit before the optically detected object-related data are transmitted to the central processing unit. If the plausibility check is carried out in the detection unit, a transmission of implausible object-related data to the central processing unit can be avoided. In particular, the object-related data can be transmitted to the central processing unit when the plausibility check of the object-related data shows that they are plausible. In this case, it can be indicated to the user of the detection unit that the object-related data are plausible. In addition, the object-related data can not be transmitted to the central processing unit when the plausibility check of the object-related data shows that they are implausible. In this case, it can be indicated to the user of the detection unit that the object-related data are implausible. In the case that the object-related data contain a date, it can be checked in the plausibility check whether the day specification has 1 or 2 digits and is not greater than 31, whether there is then a full stop, whether the month specification has 1-2 digits and is less than 13 and whether again there is then a full stop and whether the year is greater than 1950. If all of these conditions are met, it can be concluded that the object-related data are plausible. If one of the named conditions is not met, it can be concluded that the object-related data are implausible. Further, in the case that the object-related data contain a batch number, it can be specified that the batch number always starts with "B" and then has 5 purely numerical digits. In this case, it can be checked in the plausibility check whether the batch number starts with "B", whether the batch number consists of six characters and whether the last five characters are numerals. If all of these conditions are met, it can be concluded that the object-related data are plausible. If one of the named conditions is not met, it can be concluded that the object-related data are implausible.

Just as the optically detected object-related data can be checked for their plausibility in a plausibility check, the optically detected one unique identification code from the set of unique identification codes and/or the detected item of additional information can also be checked for their plausibility, in particular before they are stored in the central processing unit or already before they are transmitted to the central processing unit. If, for example, it is specified that each unique identification code has ten digits and is alphanumeric, it can be checked in the plausibility check whether the optically detected unique identification code has ten digits and is alphanumeric. If both conditions are met, it can be concluded that the optically detected unique identification code is plausible and it can be transmitted to the central processing unit and stored there. If one of the two conditions is not met, it can be concluded that the optically detected unique identification code is implausible. In this case, a transmission of the unique identification code to the central processing unit and a storage of the unique identification code in the central processing unit can be dispensed with. The plausibility checks described in the two previous paragraphs guarantee in particular an error-free data structure, or one only containing a few errors, in the central processing unit.

In an embodiment, the method also contains the following step: assigning the detected object-related data to the attached unique identification codes. In particular, it is provided that the attached unique identification codes are stored in the central processing unit and the object-related data are transmitted to the central processing unit and are also stored in the central processing unit. If the detected object-related data are assigned to the attached unique identification codes, a particular attached unique identification code can be optically detected and the object-related data assigned to the optically detected attached unique identification code can then be inferred on the basis of the optically detected attached unique identification code.

In an embodiment, the number of objects forms a predefined object sequence which defines a first object of the number of objects and a last object of the number of objects, wherein the unique identification codes of the number of unique identification codes are attached to the objects one after the other in a sequence corresponding to the predefined code sequence, with the result that the first unique identification code is attached to the first object and the last unique identification code is attached to the last object. The assignment of the unique identification codes to the objects can be influenced via the predefined object sequence. For example, the assignment of the unique identification codes to the objects can be changed by changing the predefined object sequence. Further, with the aid of the code sequence and the object sequence and the fact that the unique identification codes of the number of unique identification codes are attached to the objects in a sequence corresponding to the predefined code sequence, the assignment of the unique identification codes to the objects can already be known and for example stored in the central processing unit before attaching the unique identification codes to the objects. In particular, with the aid of the code sequence and the object sequence and the fact that the unique identification codes of the number of unique identification codes are attached to the objects in a sequence corresponding to the predefined code sequence, the assignment of the unique identification codes to the object-related data can already be known and for example stored in the central processing unit before attaching the unique identification codes to the objects. This is in particular advantageous when the object-related data of the objects, or at least for some object pairs, differ from one another. In particular, in this case, the assignment of the unique identification codes to the object-related data before attaching the number of unique identification codes from the set of unique identification codes to the number of objects can be taken into consideration in subsequent method steps. Further, when the current assignment of the unique identification codes to the object-related data in the predefined code sequence and when the unique identification codes of the number of unique identification codes are attached to the objects, in particular one after the other, in a sequence corresponding to the predefined code sequence, the current assignment of the unique identification codes to the object-related data can be influenced before attaching the number of unique identification codes from the set of unique identification codes to the number of objects. In particular, the objects can be grouped on the basis of disjoint properties, wherein the objects of a group of objects with a particular disjoint property neighbor one another in the object sequence. In this case, the memory requirements for the assignment of the unique identification codes to the object-related data can be reduced considerably, as for example only the first object of a particular group of objects with a particular disjoint property within the object sequence and the last object of the particular group of objects with the particular disjoint property within the object sequence as well as the disjoint property have to be stored in the central processing unit, for example.

In an embodiment, the method also contains the following step: producing the set of labels such that the labels are produced one after the other in the predefined label sequence. In particular, it is provided that items of information which represent the code sequence are stored in the central processing unit. For example, it can be provided that an item of information which represents that the label sequence corresponds to the code sequence is additionally stored in the central processing unit. As the label sequence can correspond to the code sequence and the labels can be produced one after the other in the predefined label sequence, the unique identification codes in the code sequence can be printed onto the unprinted labels—in particular not yet printed with the unique identification codes—one after the other, with the result that the labels provided with the unique identification codes can already be rolled up in order to form the label roll before all unique identification codes of the set of unique identification codes are applied to the labels of the set of labels. As a result, the production of the label roll can be designed in a particularly space-saving and time-efficient manner.

In an embodiment, the attachment of the number of labels to the number of objects comprises a gluing. A gluing represents a particularly simple material-bonding connection between the labels and the objects.

In an embodiment, the attachment of the number of unique identification codes from the set of unique identification codes to the number of objects comprises a printing of the number of unique identification codes from the set of unique identification codes onto the number of objects. In this case, the unique identification codes as well as the code sequence can be generated within the central processing unit—without having to print off the unique identification codes onto a carrier, such as for example a label, and the unique identification codes can then be stored in the central processing unit. This preferred embodiment of the method makes it possible to attach the unique identification codes to the objects and at the same time to dispense with a use of labels, which results in a particularly resource-efficient method.

In an embodiment, the method also contains the following steps: optically detecting a unique identification code; inferring the object-related data assigned to the optically detected unique identification code on the basis of the optically detected unique identification code; and displaying the object-related data assigned to the optically detected unique identification code. In particular, in the case that object-related data attached to an object are damaged such that a user cannot recognize these data or that the object-related data cannot be inferred from items of information attached to the object—in addition to the unique identification code—inferring the object-related data assigned to the optically detected unique identification code on the basis of the optically detected unique identification code provides a reliable method for displaying the object-related data assigned to the unique identification code, in particular to a user of the detection unit.

Although the method steps are described in a particular order, the present invention is not limited to this order. Instead, the individual method steps can be carried out in any reasonable order, in particular also, at least in portions, in parallel with one another in terms of time.

According to a second aspect of the invention, the object named at the beginning is achieved by a system adapted for attaching a number of unique identification codes from a set of unique identification codes to a number of objects. The system comprises a detection unit and means for performing the method according to one of the preceding claims. The features, technical effects and/or advantages described in connection with the method according to the first aspect also apply, at least analogously, to the system according to the second aspect of the invention, with the result that a corresponding repetition at this point is dispensed with. In an embodiment, the detection unit is a mobile telephone. In an embodiment, the means comprise the central processing unit, which can contain a first database and/or is connected to a second database.

According to a third aspect of the invention, the object named at the beginning is achieved by a computer program that comprises commands which cause the system according to the second aspect of the invention to perform the steps of the method according to the first aspect of the invention. The features, technical effects and/or advantages described in connection with the other aspects of the invention also apply, at least analogously, to the computer program according to the third aspect of the invention, with the result that a corresponding repetition at this point is dispensed with. In an embodiment, the commands comprise commands of an app, which can be stored in the detection unit and executed by it.

According to a fourth aspect of the invention, the object named at the beginning is achieved by a computer-readable medium. The computer program according to the third aspect of the invention is stored on the computer-readable medium. The features, technical effects and/or advantages described in connection with the other aspects of the invention also apply, at least analogously, to the computer-readable medium according to the fourth aspect of the invention, with the result that a corresponding repetition at this point is dispensed with.

BRIEF DESCRIPTION OF THE DRAWINGS

Further features, advantages and possible applications of the present invention are revealed by the following description of the embodiment examples and the figures. All features described and/or depicted, separately and in any combination, form the subject-matter of the invention, also independently of their configuration in the individual claims or their references back. In the figures, identical reference numbers furthermore represent identical or similar objects.

DETAILED DESCRIPTION

Figure 1:
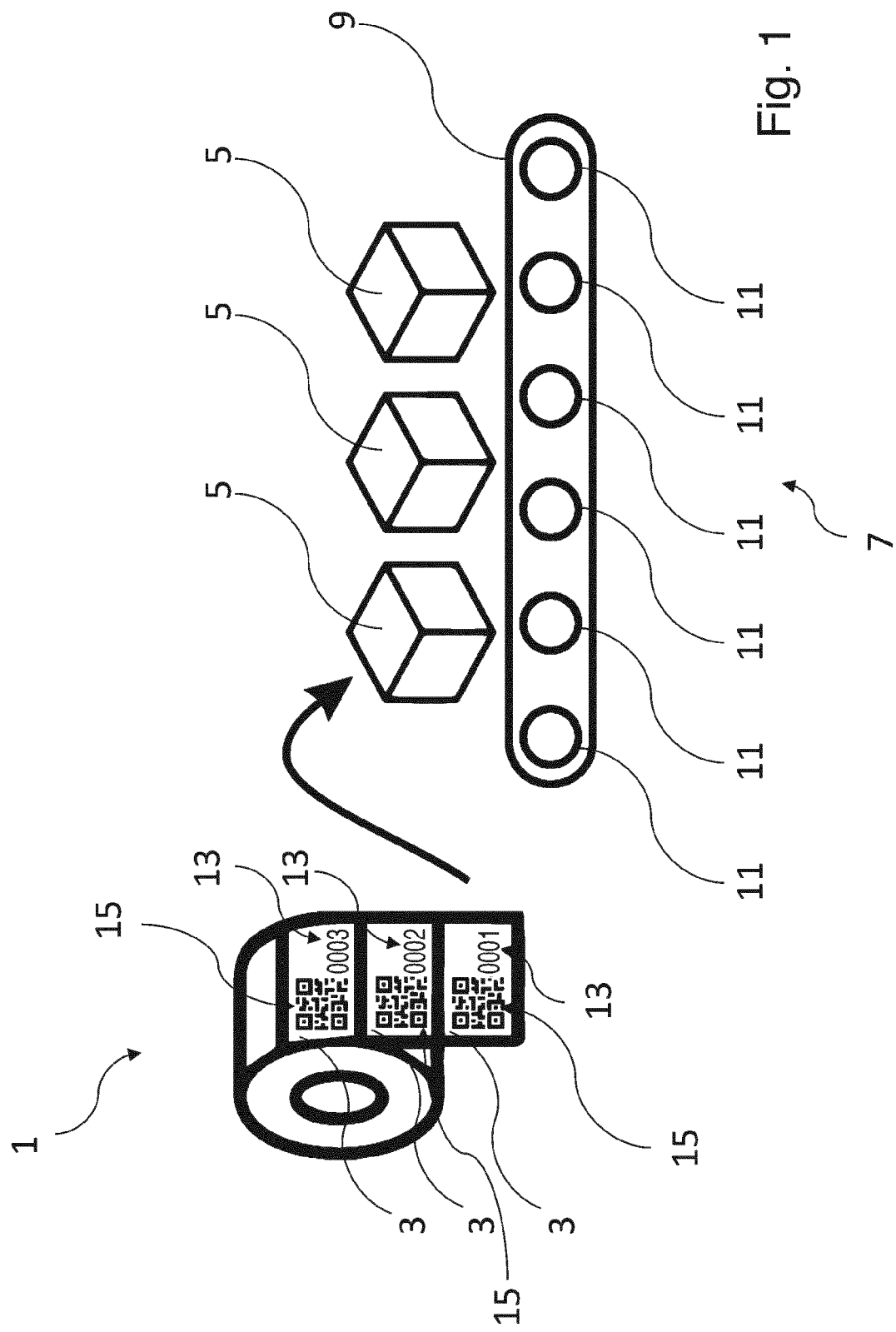
FIG. 1 shows a schematic view of a label roll with a set of labels, of objects of a number of objects and of a conveying device.

FIG. 1 shows a schematic view of a label roll 1 with a set of labels 3, which contains a number of labels 3. The set of labels 3 contains ten thousand labels 3 and the number of labels 3 contains one thousand labels 3. The set of labels 3 thus contains more labels 3 than the number of labels 3. This is an example of the fact that a number of labels 3 is provided from a set of labels 3. The set of labels 3 forms a predefined label sequence.

Further, a schematic view of objects 5 of a number of objects 5 is represented in FIG. 1. Three objects 5 are represented by way of example in FIG. 1, wherein the number of objects 5 in the embodiment example represented here contains one thousand objects 5. In addition, a conveying device 7 is represented in FIG. 1, which contains a conveyor belt 9 and several conveyor rollers 11, which the conveyor belt 9 surrounds in a friction-locking manner. The objects 5 can be positioned on the conveyor belt 9 and moved by moving the conveyor belt 9 over the conveyor rollers 11. For example, the objects 5 can be moved past an attaching unit with the aid of the conveying device 7, with the result that the number of labels 3 can be attached to the number of objects 5 with the aid of an attaching unit arranged in a stationary manner in relation to the conveyor belt 9.

Each label 3 of the set of labels 3 contains a unique identification code 13 of a set of unique identification codes 13 which differ from one another. The unique identification codes 13 form a predefined code sequence which defines a first unique identification code 13 and a last unique identification code 13. Further, the set of labels 3 forms a predefined label sequence. Here, the label sequence corresponds to the code sequence, with the result that, in the label sequence, a first label 3 is provided with the first unique identification code 13 and a last label 3 is provided with the last unique identification code 13.

In addition, each label 3 contains a QR code 15, which represents object-related data to be optically detected. In the embodiment example represented in FIG. 1, the QR codes 15 at least of the labels 3 of the number of labels 3 are identical. This is particularly advantageous when it is already known before the production of the label roll 1 that the labels 3 of the number of labels 3 are to be attached to objects which have the same properties, as the unique identification codes 13 and the object-related data to be optically detected can thus be jointly, preferably simultaneously, attached to each object 5 of the objects 5, with the result that a particularly time-efficient attachment of the unique identification codes 13 and the object-related data to be optically detected to the objects 5 is guaranteed. The number of objects can therefore be assigned object-related data which can be represented by the QR codes 15. In addition to the object-related data to be optically detected, the object-related data can also contain object-related data to be manually detected. In this case, the object-related data to be manually detected are manually detected.

A step of the method according to the invention is schematically represented by the arrow represented in FIG. 1, in which the number of labels 3 from the set of labels 3 is attached to the number of objects 5 by gluing, with the result that one label 3 is attached to each object 5. As each label 3 of the number of labels 3 contains a unique identification code 13, a number of unique identification codes 13 from a set of unique identification codes 13 are attached to the number of objects 5 by attaching the labels 3 of the number of labels 3 to the objects 5 of the number of objects 5, with the result that one unique identification code 13 is attached to each object 5 of the number of objects 5.

Figure 2:
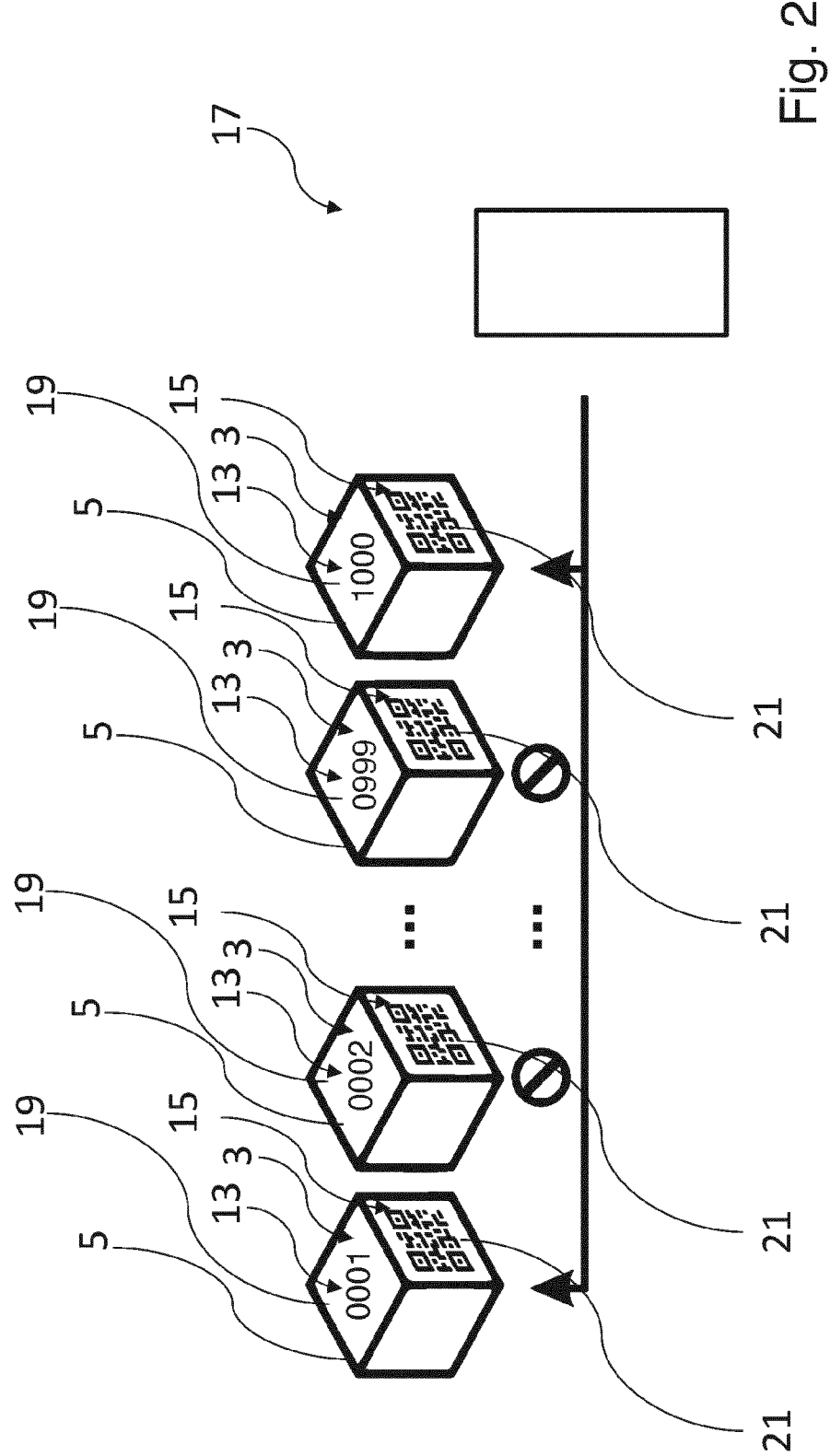
FIG. 2 shows a schematic view of a detection unit and of the number of objects, of which three objects are represented in FIG. 1, wherein a number of labels of the set of labels of the label roll represented in FIG. 1 are attached to the objects.

FIG. 2 shows a schematic view of a detection unit 17. Further, FIG. 2 shows a schematic view of the number of objects 5, of which three objects 5 are represented in FIG. 1. The number of labels 3 of the set of labels 3 of the label roll 1 represented in FIG. 1 is attached to the objects 5. In the embodiment represented here, the labels 3 are realized in two parts, wherein a first part 19 of each label 3 contains a unique identification code 13 of the unique identification codes 13 and a second part 21 of each label 3 contains a QR code 15 of the QR codes 15. The two-part realization of the labels 3 guarantees that the first part 19 and the second part 21 of each label 3 can be attached to the object 5 positioned independently of one another and/or oriented independently of one another.

As already described, the unique identification codes 13 form a predefined code sequence which defines a first unique identification code 13 and a last unique identification code 13. In the embodiment example represented here, the attached unique identification codes 13 are the unique identification codes 13 of the number of unique identification codes 13. The first attached unique identification code 13 is one ("0001") and the last attached unique identification code 13 is one thousand ("1000"). The unique identification codes 13 two ("002") to nine hundred and ninety-nine ("999") positioned between the first attached unique identification code 13 and the last attached unique identification code 13 in the code sequence are arranged and positioned in ascending order—seen from the first attached unique identification code 13 to the last attached unique identification code 13.

As also already described, the set of labels 3 forms a predefined label sequence, wherein the label sequence corresponds to the code sequence. In the embodiment example represented here, the attached labels 3 are the labels 3 of the number of labels 3. The first attached label 3 contains the first attached unique identification code 13 ("0001") and the last attached label 3 contains the last attached unique identification code 13 ("1000"). The labels 3 positioned between the first attached label 3 and the last attached label 3 in the label sequence contain the unique identification codes 13 two ("0002") to nine hundred and ninety-nine ("0999") positioned between the first attached unique identification code 13 and the last attached unique identification code 13 in the code sequence in ascending order—seen from the first attached unique identification code 13 to the last attached unique identification code 13. In FIG. 2, both the code sequence and the label sequence are thus defined from left to right.

A further step of the method according to the invention is schematically represented below the objects 5 in FIG. 2, in which it is indicated with the two arrows that the first attached unique identification code 13 ("0001") and the last attached unique identification code 13 ("1000") are optically detected with the aid of the detection unit 17. Here, both the first attached label 3 and the last attached label 3 are optically detected with the aid of the detection unit 17. The first attached unique identification code 13 can also be regarded as a "unique identification code" according to claim 1 and the last attached unique identification code can also be regarded as a "further unique identification code" according to claim 2, wherein the last attached unique identification code 13 is a component of an item of additional information, which is optically detected by the detection unit 17.

Further, in addition to the first attached unique identification code 13 ("0001") and the last attached unique identification code 13 ("1000"), both the QR code 15 of the first attached label 3 and the QR code 15 of the second attached label 3 are optically detected with the aid of the detection unit 17, with the result that the object-related data are optically detected by the detection unit 17.

Figure 3:
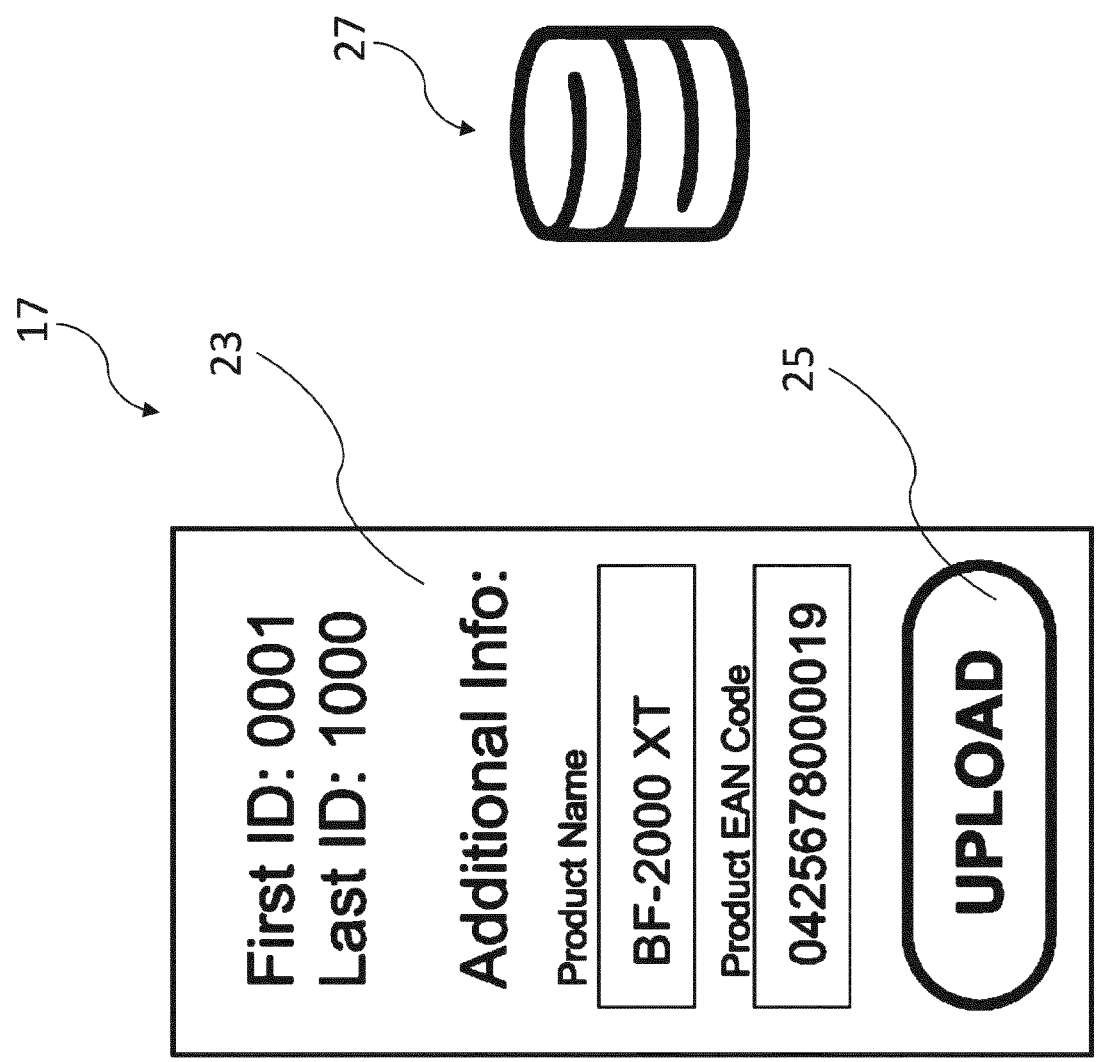
FIG. 3 shows a schematic view of the detection unit in FIG. 2.

FIG. 3 shows a schematic view of the detection unit 17 from FIG. 2. The detection unit 17 contains a display unit 23, which is formed as a touchscreen. The display unit 23 displays the first attached unique identification code 13 ("0001"), the last attached unique identification code 13 ("1000") and object-related data in the form of a product name ("BF-2000 XT") and a product EAN code ("0425678000019"), which are attached to the objects 5 in encoded form with the aid of each QR code 15. In order to display these items of information, the optically detected first attached unique identification code 13 ("0001"), the optically detected last attached unique identification code 13 ("1000") and the optically detected object-related data are stored in the detection unit 17. Further, the display unit 23 contains a transmission field 25, which, when touched by a user of the detection unit 17, makes an attempt to transmit the optically detected first attached unique identification code 13 ("0001"), the optically detected last attached unique identification code 13 ("1000") and the optically detected object-related data from the detection unit 17 to a central processing unit 27.

Figure 4:
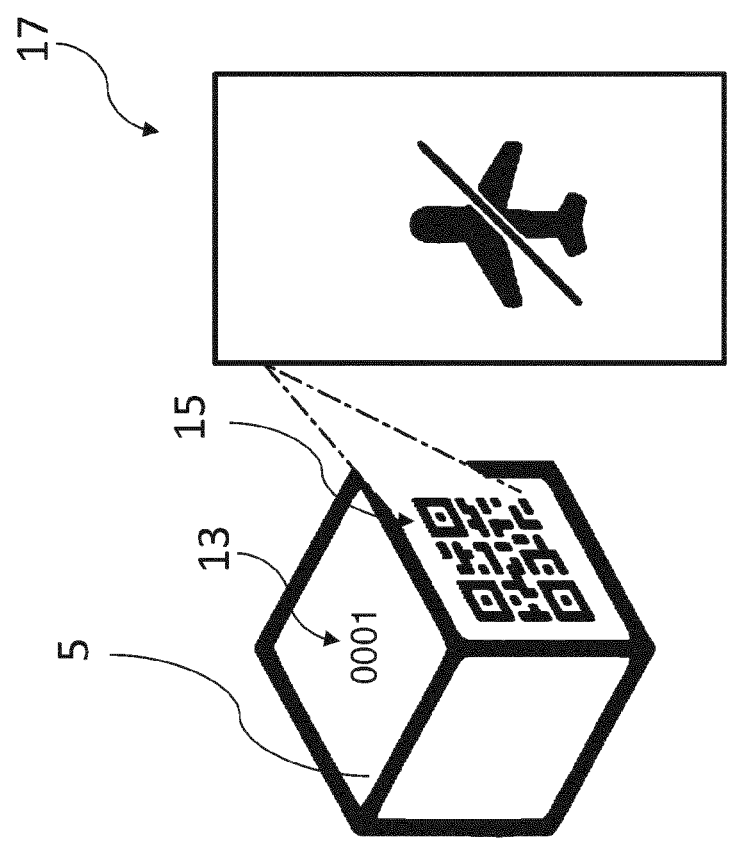
FIG. 4 shows a schematic view of an object of the number of objects from FIG. 2 as well as the detection unit from FIG. 2.

FIG. 4 shows a schematic view of an object 5 of the number of objects 5 from FIG. 2 as well as the detection unit 17 from FIG. 2. The detection unit 17 is represented in an offline state and during the detection of the unique identification code 13 and the QR code 15 in FIG. 4. In the offline state, the unique identification code 13 and the QR code 15 are stored in the detection unit 17.

Figure 5:
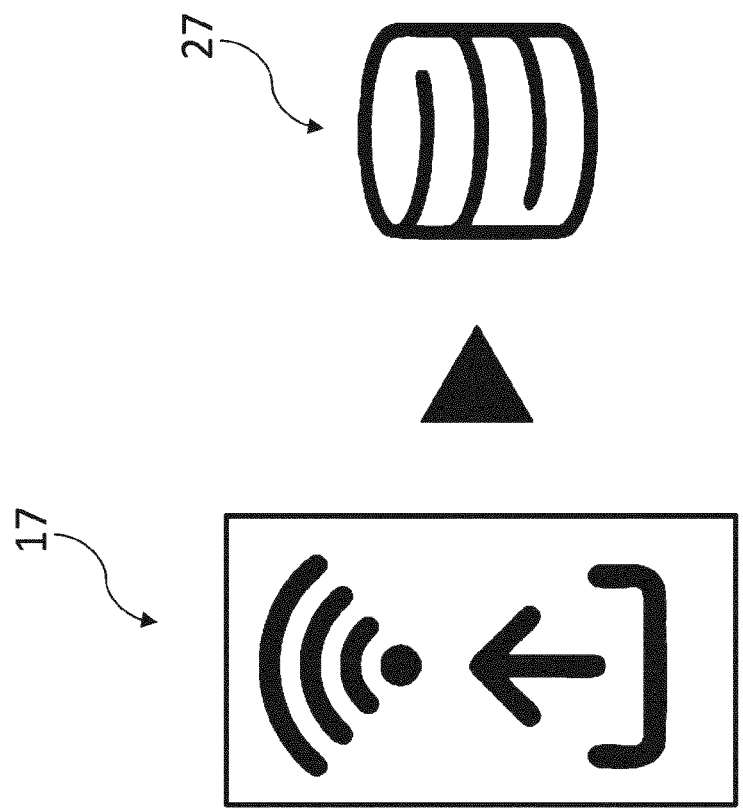
FIG. 5 shows a schematic view of the detection unit from FIG. 2 and of a central processing unit.

FIG. 5 shows a schematic view of the detection unit 17 from FIG. 2 and of the central processing unit 27. The detection unit 17 is in an online state in FIG. 5. When the detection unit 17 is in the online state, the unique identification code 13 represented in FIG. 4 and the QR code 15 represented in FIG. 4, or the item of information present in encoded form in the QR code 15 represented in FIG. 4, are transmitted to the central processing unit 27, after the user of the detection unit 17 has touched the transmission field 25 represented in FIG. 4.

Figure 6:
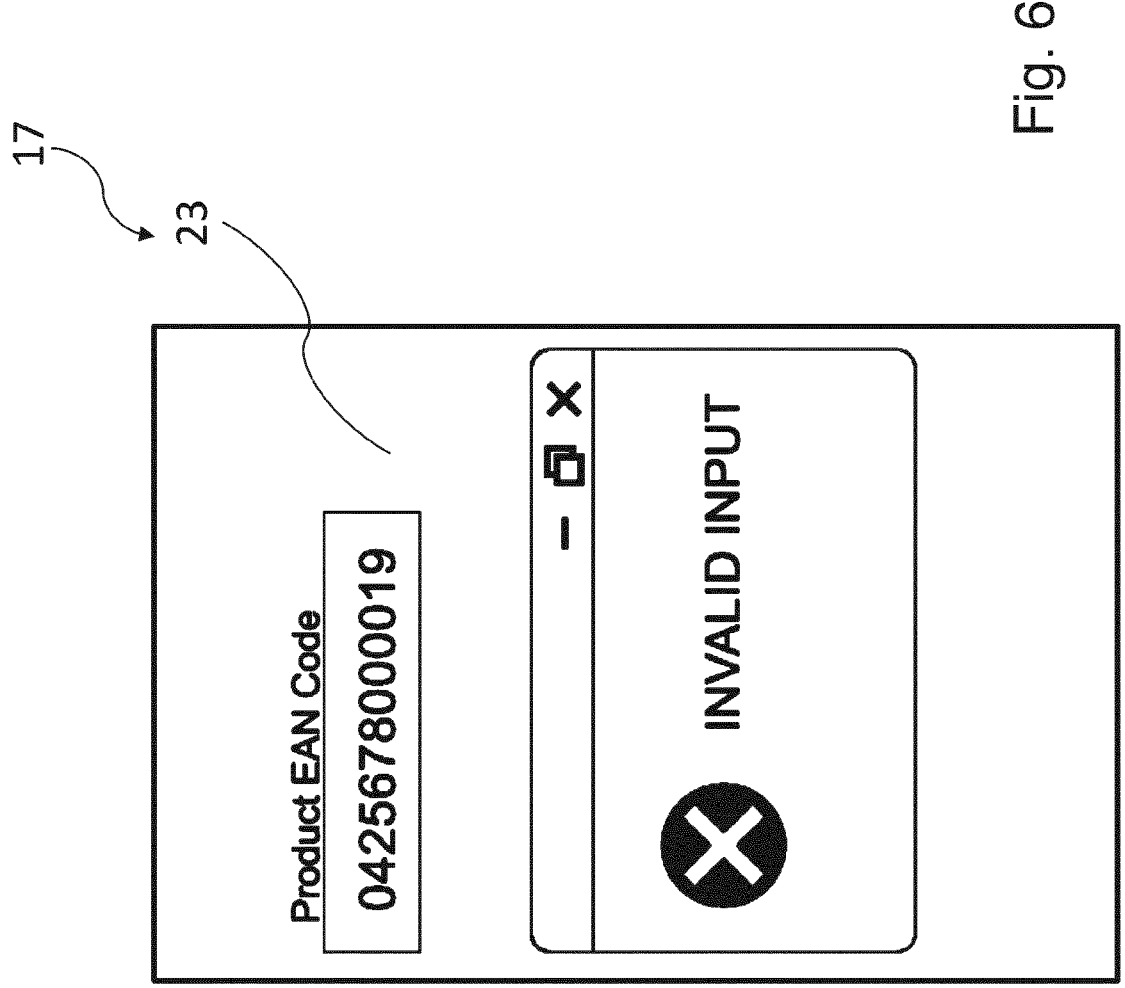
FIG. 6 shows a schematic view of the detection unit from FIG. 2.

FIG. 6 shows a schematic view of the detection unit 17 from FIG. 2, wherein the display unit 23 displays the product EAN code "0425678000019" as well as an indication that an input to the detection unit is invalid. This can be the case when the product EAN code "0425678000019" was, for example, manually detected with the aid of the detection unit 17, was transmitted to the central processing unit 27 represented in FIG. 5, but no product EAN code "0425678000019" is stored in the central processing unit 27, and the central processing unit 27 has transmitted an item of information about this to the detection unit 17.

Figure 7:
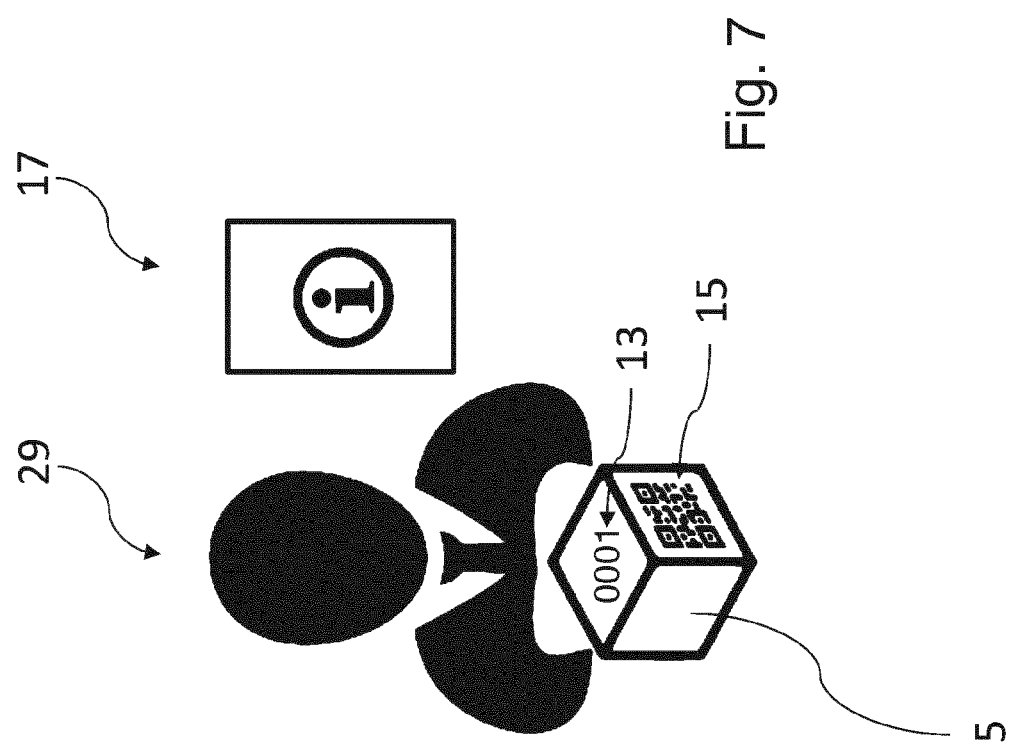
FIG. 7 shows a schematic view of a user of the detection unit, of the detection unit and of an object.

FIG. 7 shows a schematic view of a user 29 of the detection unit 17 and of an object 5 with the unique identification code 13 "0001" and the QR code 15. The user 29 can optically detect the unique identification code 13 with the aid of the detection unit 17. The optically detected unique identification code 13 can then be transmitted to the central processing unit 27. In the central processing unit 27, the object-related data assigned to the optically detected unique identification code 13 can then be inferred on the basis of the optically detected unique identification code 13. The object-related data can then be transmitted from the central processing unit to the detection unit. The object-related data assigned to the optically detected unique identification code 13 can then be displayed by the detection unit 17. In particular, in the case that the QR code is damaged such that the object-related data present in encoded form in it can no longer be determined from it by a decoding process, inferring the object-related data assigned to the optically detected unique identification code 13 on the basis of the optically detected unique identification code 13 provides a reliable method for displaying the object-related data assigned to the unique identification code 13.

Figure 8:
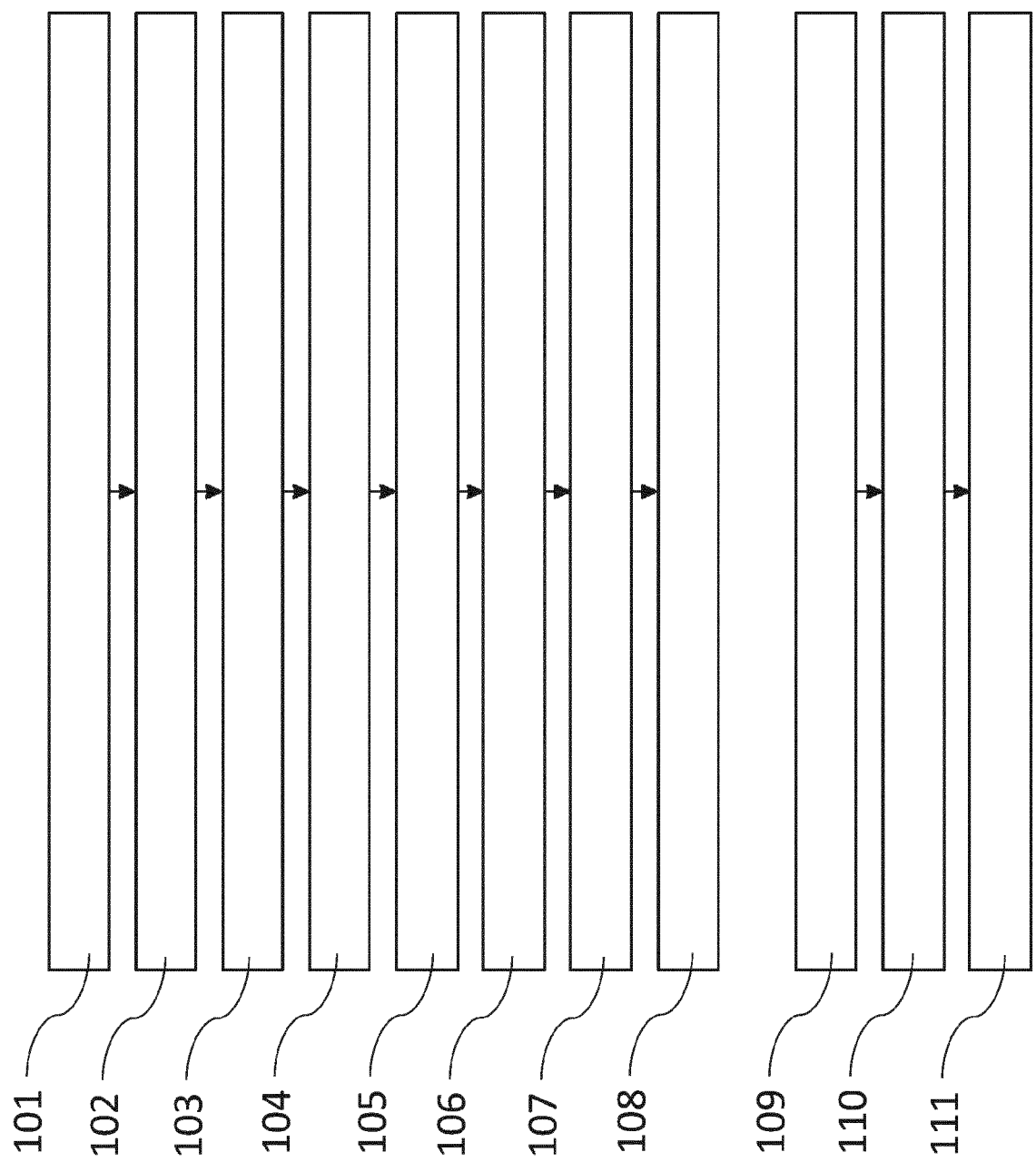
FIG. 8 shows a schematic view of a flow diagram of an embodiment of the method according to the invention.

FIG. 8 shows a schematic view of a flow diagram of an embodiment of the method according to the invention. In a first step 101, the unique identification codes 13 of the set of unique identification codes 13 are produced. In the embodiment example described here, labels 3 of a set of labels 3 of the label roll 1 represented in FIG. 1 are produced for this. Each produced label 3 of the set of labels 3 contains a unique identification code 13 of the set of unique identification codes 13. The set of labels 3 forms a predefined label sequence on the produced label roll 1—seen from the first label 3 of the label roll 1 (with the unique identification code 13 "0001"), which is arranged right on the outside in the label roll 1, to the last label 3 of the label roll 1 (with the unique identification code 13 "10000"), which is arranged right on the inside in the label roll. In addition, the unique identification codes 13 form a predefined code sequence which corresponds to the label sequence. In the embodiment example described here, the set of labels 3 is produced such that the labels 3 are produced one after the other in the predefined label sequence. As the label sequence corresponds to the code sequence and the labels are produced one after the other in the predefined label sequence, the unique identification codes 13 can be printed onto the unprinted labels 3 one after the other in the code sequence, with the result that the labels 3 provided with the unique identification codes 13 can already be rolled up in order to form the label roll 1 before all unique identification codes 13 of the set of unique identification codes 13 are applied to the labels 3 of the set of labels 3. As a result, the production of the label roll 1 can be designed in a particularly space-saving and time-efficient manner.

In a second step 102, the unique identification codes 13 of the set of unique identification codes 13 are optically detected, for example by scanning, and transmitted to the central processing unit 27. The optical detection can, for example, occur while the first step 101 is being carried out, as a result of which a particularly time-efficient method is provided. In addition to the optical detection of the unique identification codes 13, the code sequence, which defines the set of unique identification codes 13, is determined. The determination of the code sequence can be guaranteed, for example, in that the unique identification codes 13 are optically detected one after the other in terms of time, i.e. one after the other in terms of time from "0001" to "10000" in ascending order, in the predefined code sequence, the unique identification codes 13 thus ordered are transmitted to the central processing unit and the unique identification codes 13, together with the code sequence, are stored in the central processing unit 27. After these steps have been carried out, the unique identification codes 13 of the set of unique identification codes 13 as well as the code sequence are therefore stored in the central processing unit 27, wherein the code sequence is defined by the positions of the unique identification codes 13 on the label roll.

In a third step 103, the number of labels 3 (the labels 3 with the unique identification codes "0001" to "1000") from the set of labels 3 is attached to the number of objects 5. After attaching the number of labels 3 to the number of objects 5, one label 3 of the number of labels 3 is attached to each object 5 of the number of objects, which is also represented by way of example in FIG. 2. By attaching the labels 3 of the number of labels 3, which contain the number of unique identification codes 13, the number of unique identification codes 13 from the set of unique identification codes 13 are thus attached to the number of objects. After attaching the number of unique identification codes 13, these unique identification codes 13 can also be referred to as attached unique identification codes 13. In the present example, the first attached label 3 contains the first attached unique identification code 13 ("0001") and the last attached label 3 contains the last attached unique identification code 13 ("1000").

In the embodiment example described here, the number of objects forms a predefined object sequence which defines a first object 5 of the number of objects 5 and a last object 5 of the number of objects 5, wherein the unique identification codes 13 of the number of unique identification codes 13 are attached to the objects, in particular one after the other, in a sequence corresponding to the predefined code sequence, with the result that the first unique identification code 13 is attached to the first object 5 and the last unique identification code 13 is attached to the last object 5. The assignment of the unique identification codes 13 to the objects 5 can be influenced via the predefined object sequence. For example, the assignment of the unique identification codes 13 to the objects can be changed by changing the predefined object sequence. Further, with the aid of the code sequence and the object sequence and the fact that the unique identification codes 13 of the number of unique identification codes 13 are attached to the objects in a sequence corresponding to the predefined code sequence, the assignment of the unique identification codes 13 to the objects 5 can already be known and for example stored in the central processing unit 27 before attaching the unique identification codes 13 to the objects 5. In particular, with the aid of the code sequence and the object sequence and the fact that the unique identification codes 13 of the number of unique identification codes 13 are attached to the objects in a sequence corresponding to the predefined code sequence, the assignment of the unique identification codes 13 to the object-related data can already be known and for example stored in the central processing unit 27 before attaching the unique identification codes 13 to the objects 5. This is in particular advantageous when the object-related data of the objects 5, or at least for some object pairs, differ from one another. In particular, in this case, the assignment of the unique identification codes 13 to the object-related data before attaching the number of unique identification codes 13 from the set of unique identification codes 13 to the number of objects 5 can be taken into consideration in subsequent method steps. Further, when the current assignment of the unique identification codes 13 to the object-related data in the predefined code sequence and when the unique identification codes 13 of the number of unique identification codes 13 are attached to the objects, in particular one after the other, in a sequence corresponding to the predefined code sequence, the current assignment of the unique identification codes 13 to the object-related data can be influenced before attaching the number of unique identification codes 13 from the set of unique identification codes 13 to the number of objects. In particular, the objects 5 can be grouped on the basis of disjoint properties, wherein the objects 5 of a group of objects with a particular disjoint property neighbor one another in the object sequence. In this case, the memory requirements for the assignment of the unique identification codes 13 to the object-related data can be reduced considerably, as for example only the first object of a particular group of objects with a particular disjoint property within the object sequence and the last object of the particular group of objects with the particular disjoint property within the object sequence as well as the disjoint property have to be stored in the central processing unit 27, for example.

In an alternative embodiment of the method according to the invention, the attachment of the number of unique identification codes 13 from the set of unique identification codes 13 to the number of objects in the third step 103 can comprise a printing of the number of unique identification codes 13 from the set of unique identification codes 13 onto the number of objects. In this case, in the first method step 101 the unique identification codes 13 as well as the code sequence can be generated within the central processing unit 27—without having to print off the unique identification codes 13 onto a carrier, such as for example a label 3, and then in the second method step can be stored in the central processing unit 27. This alternative embodiment of the method makes it possible to attach the unique identification codes 13 to the objects 5 and at the same time to dispense with a use of labels 3, which results in a particularly resource-efficient method.

In a fourth step 104, the first attached unique identification code 13 "0001" from the set of unique identification codes 13 and the last attached unique identification code 13 "1000", which is present as part of an item of additional information attached to the corresponding object 5, are optically detected with the aid of the detection unit 17.

In the fourth step 104, the first attached unique identification code 13 "0001" from the set of unique identification codes 13 and the positions of the first attached unique identification code 13 "0001" relative to the first attached unique identification code 13 "0001" and to the last attached unique identification code 13 "1000" in the predefined code sequence can alternatively also be detected. The relative positions here form a part of the items of additional information, which in this example can be manually input into the detection unit. In the example described here, the position relative to the first attached unique identification code 13 "0001" is zero, i.e. the optically detected unique identification code 13 from the set of unique identification codes 13 corresponds to the first attached unique identification code 13 in the predefined code sequence. Further, in the example described here, the position relative to the last attached unique identification code 13 "1000" is nine hundred and ninety-nine.

In addition, in the fourth step 104 the last attached unique identification code 13 "1000" from the set of unique identification codes 13 and the positions of the last attached unique identification code 13 "1000" relative to the first attached unique identification code 13 "0001" and to the last attached unique identification code 13 "1000" in the predefined code sequence can alternatively be detected. The relative positions here form a part of the items of additional information, which in this example can be manually input into the detection unit. In the example described here, the position relative to the last attached unique identification code 13 "1000" is zero, i.e. the optically detected unique identification code 13 from the set of unique identification codes 13 corresponds to the last attached unique identification code 13 in the predefined code sequence. Further, in the example described here, the position relative to the first attached unique identification code 13 "0001" is nine hundred and ninety-nine.

The two last-named alternatives can be particularly advantageous as, in these embodiment examples, the respective optically detected unique identification code 13 need not be part of the number of unique identification codes 13. For example, the optically detected unique identification code 13 from the set of unique identification codes 13 can be provided after the last attached unique identification code 13 in the predefined code sequence or the optically detected unique identification code 13 from the set of unique identification codes 13 is provided before the first attached unique identification code 13 in the predefined code sequence.

Further, in the fourth step 104 the first attached unique identification code 13 "0001" from the set of unique identification codes 13 and the last attached unique identification code 13 "1000", which is present as part of an item of additional information attached to the corresponding object 5 and can also be referred to as further unique identification code 13, can alternatively also be optically detected with the aid of the detection unit 17 and, in addition, the position of the optically detected first attached unique identification code 13 relative to the first attached unique identification code 13 in the predefined code sequence and the position of the optically detected last attached unique identification code 13 relative to the last attached unique identification code 13 in the predefined code sequence can alternatively also be detected. In the example described here, the position relative to the first attached unique identification code 13 "0001" is zero, i.e. the optically detected unique identification code 13 from the set of unique identification codes 13 corresponds to the first attached unique identification code 13 in the predefined code sequence. Further, in the example described here, the position relative to the last attached unique identification code 13 "1000" is likewise zero, i.e. the optically detected second unique identification code 13 from the set of unique identification codes 13 corresponds to the last attached unique identification code 13 in the predefined code sequence.

Further, in a fifth step 105 object-related data, which are attached to the objects 5 of the number of objects 5 in the form of the QR code 15, are optically detected with the aid of the detection unit 17. The QR codes 15 attached to the number of objects 5 are identical. As the QR codes 15 are identical, only one QR code 15 of the QR codes has to be optically detected and the object-related data can be optically detected in a simple and time-efficient manner with the aid of the detection unit 17.

In a sixth step 106, the first attached unique identification code 13 "0001" optically detected with the aid of the detection unit 17, the last attached unique identification code 13 "1000" optically detected with the aid of the detection unit 17 and the object-related data optically detected with the aid of the detection unit 17 are stored in the detection unit 17. The storage of the optically detected first attached unique identification code 13 "0001", the optically detected last attached unique identification code 13 "1000" and the optically detected object-related data in the detection unit 17 guarantees operation of the detection unit 17 even when it is in an offline state, in which the detection unit 17 cannot send data which represent the optically detected first attached unique identification code 13 "0001", the optically detected last attached unique identification code 13 "1000" and the optically detected object-related data to the central processing unit via a communication interface.

In a seventh step 107, the first attached unique identification code 13 "0001" optically detected with the aid of the detection unit 17, the last attached unique identification code 13 "1000" optically detected with the aid of the detection unit 17 and the object-related data optically detected with the aid of the detection unit 17 are transmitted to the central processing unit 27 and stored in the central processing unit 27. The transmission to and storage in the central processing unit 27 of the first attached unique identification code 13 "0001" optically detected with the aid of the detection unit 17, the last attached unique identification code 13 "1000" optically detected with the aid of the detection unit 17 and the object-related data optically detected with the aid of the detection unit 17 has the advantage that the first attached unique identification code 13 "0001" optically detected with the aid of the detection unit 17, the last attached unique identification code 13 "1000" optically detected with the aid of the detection unit 17 and the object-related data optically detected with the aid of the detection unit 17 can be utilized for further evaluations. For example, the attached unique identification codes 13 can be inferred on the basis of the optically detected first attached unique identification code 13 "0001" and the optically detected last attached unique identification code 13 "1000". The object-related data optically detected with the aid of the detection unit 17 can, for example, be displayed to a user of the detection unit 17, in particular at a later point in time, for example in a shop.

Further, in the seventh step, the attached unique identification codes 13 are inferred on the basis of the optically detected first attached unique identification code 13 "0001" and the optically detected last attached unique identification code 13 "1000" using the central processing unit 17. As unique identification codes 13 form the code sequence and this is stored in the central processing unit 17, it can be inferred that, in addition to the optically detected first attached unique identification code 13 "0001" and in addition to the optically detected last attached unique identification code 13 "1000", the further unique identification codes 13 of the number of unique identification codes 13, namely the unique identification codes 13 "0002" to "0999", are also attached to the number of objects. By inferring the attached unique identification codes 13 as described here, inferring the attached unique identification codes 13 is made much easier and quicker, in particular compared with an optical detection of each individual attached unique identification code 13. In the case described at present, the attached unique identification codes 13 are inferred such that first of all the position of the first attached unique identification code 13 within the code sequence and the position of the last attached unique identification code 13 within the code sequence are determined and, on the basis of this information, the positions of the attached unique identification codes 13 within the code sequence and then the attached unique identification codes 13 themselves are inferred.

In an eighth step 108, the object-related data stored in the central processing unit 27 are assigned to the attached unique identification codes 13 of the number of unique identification codes 13. In particular, each unique identification code 13 of the number of unique identification codes 13 is assigned the object-related data and this assignment is stored in the central processing unit 27. Thus, for each unique identification code 13 the object-related data can be inferred.

In a ninth step 109, a unique identification code 13 of the number of unique identification codes 13 attached to an object 5 is optically detected with the aid of the detection unit 17 and transmitted to the central processing unit 27. In a tenth step 110, in the central processing unit 27 this attached unique identification code 13 is compared with unique identification codes 13 stored in the central processing unit 27 and identified as attached. In the case that the unique identification code 13 optically detected in the ninth step 109 is already stored in the central processing unit and is identified as attached, in an eleventh step 111 the object-related data assigned to the unique identification code 13 are displayed to the user of the detection unit 17 on the display unit 23 of the detection unit 17.

Figure 9:
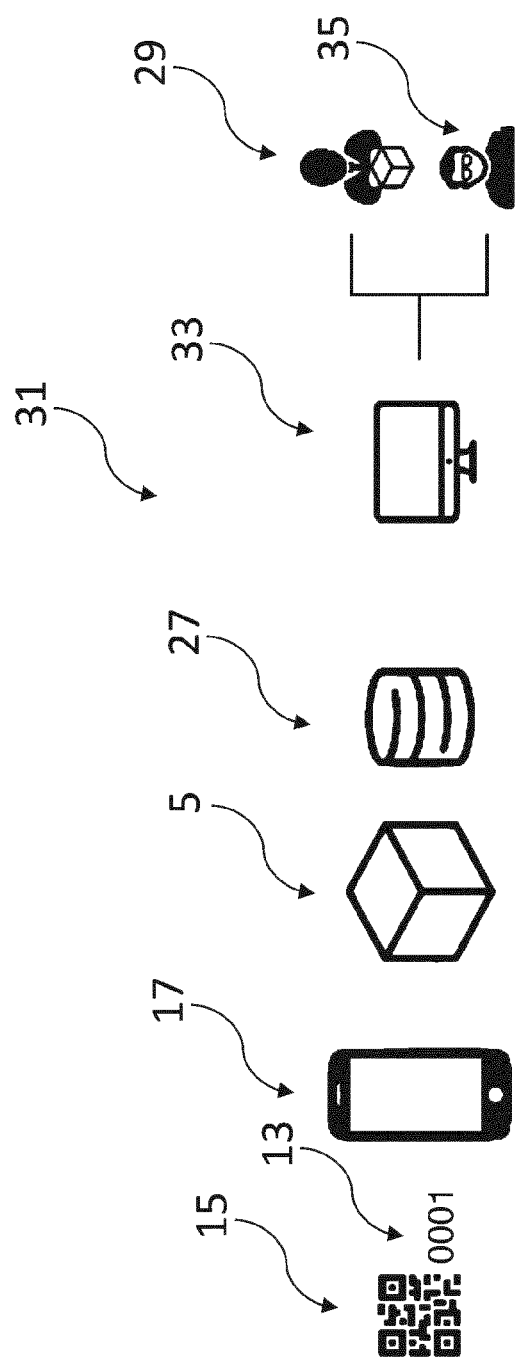
FIG. 9 shows a schematic view of an embodiment of a system according to the invention.

FIG. 9 shows a schematic view of an embodiment of a system 31 according to the invention. The system 31 is adapted to attach the number of unique identification codes 13 from the set of unique identification codes 13 and the QR codes 15 to the number of objects 5. The system comprises the detection unit 17 and means for performing the embodiment of the method described above. The means contain, among other things, the central processing unit 27. In addition, the means contain a second display unit 33, which can display the object-related data assigned to the optically detected unique identification code 13. In addition to the first user 29, a second user 35 is represented in FIG. 9. For example, it is provided that the first user 29 can identify themselves as first user 29, for example with the aid of the detection unit 17, and when they have identified themselves as first user 29, only a part of the object-related data, such as for example an expiration date, is displayed. Further, it is for example provided that the second user 35 can identify themselves as second user 35, for example with the aid of the detection unit 17, and when they have identified themselves as second user 35, all of the object-related data, such as for example a production date and an expiration date, are displayed. The first user 29 can also be referred to as end customer and the second user 35 as expert.

The method described here is performed by the detection unit 17 and means of the system for attaching the number of unique identification codes 13 from the set of unique identification codes 13 to the number of objects. Further, a computer program is provided, which comprises commands which cause the system according to the invention to perform the steps of the method according to the invention. In addition, a computer-readable medium is provided, on which the computer program is stored.

In addition to this, it should be pointed out that "containing" does not rule out any other elements or steps and "a", "an" or "one" does not rule out a plurality. Furthermore, it should be pointed out that features which have been described with reference to one of the above embodiment examples can also be used in combination with other features of other embodiment examples described above. Reference numbers in the claims are not to be regarded as a limitation.

REFERENCE NUMBERS 1 label roll
3 label
5 object
7 conveying device
9 conveyor belt
11 conveyor roller
13 unique identification code
15 QR code
17 detection unit
19 first part of a label
21 second part of a label
23 first display unit
25 transmission field
27 central processing unit
29 first user
31 system
33 second display unit
35 second user

The invention claimed is:

1. A method for attaching a number of unique identification codes from a set of unique identification codes to a number of objects,
wherein the unique identification codes differ from one another,
wherein the unique identification codes form a predefined code sequence which defines a first unique identification code and a last unique identification code,
wherein the method contains the following steps:
attaching the number of unique identification codes from the set of unique identification codes to the number of objects, such that one unique identification code is attached to each object;
optically detecting a first attached unique identification code and a last attached unique identification code from the set of unique identification codes with a detection unit;
detecting an item of additional information; and
inferring the attached unique identification codes based on the optically detected first attached unique identification code and the optically detected last attached unique identification code and the detected item of additional information,
wherein only the first attached unique identification code and the last attached unique identification code from the set of unique identification codes are optically detected by the detection unit.

2. The method according to claim 1, wherein the detection of the item of additional information comprises a detection of a position of the detected item of additional information relative to the optically detected first attached unique identification code and to the optically detected last attached unique identification code in the predefined code sequence.

3. The method according to claim 1, wherein the detection of the item of additional information comprises a detection of a position of the detected item of additional information relative to the optically detected first attached unique identification code in the predefined code sequence and comprises a detection of the position of a further detected item of additional information relative to the last attached unique identification code in the predefined code sequence.

4. The method according to claim 1, wherein a number of labels is provided from a set of labels, wherein each label of the set of labels contains a unique identification code of the set of unique identification codes, wherein the set of labels forms a predefined label sequence, wherein the label sequence corresponds to the code sequence, with the result that, in the label sequence, a first label is provided with the first unique identification code and a last label is provided with the last unique identification code, wherein the attachment of the number of unique identification codes from the set of unique identification codes to the number of objects comprises an attachment of the number of labels from the set of labels to the number of objects, with the result that one label is attached to each object, wherein the optical detection of the unique identification code from the set of unique identification codes comprises an optical detection of a label from the set of labels with the aid of the detection unit, with the result that the unique identification code of the optically detected label is detected.

5. The method according to claim 1, wherein the method also contains the following step:
storing the optically detected unique identification code and the item of additional information in the detection unit.

6. The method according to claim 1, wherein the method also contains the following step:
transmitting the optically detected unique identification code and the item of additional information to a central processing unit.

7. The method according to claim 1, wherein the optically detected first attached unique identification code from the set of unique identification codes is provided after the optically detected last attached unique identification code in the predefined code sequence.

8. The method according to claim 1, wherein the optically detected first attached unique identification code from the set of unique identification codes is provided before the optically detected last attached unique identification code in the predefined code sequence.

9. The method according to claim 1, wherein the number of objects are assigned object-related data, wherein the method also contains the following steps:
detecting the object-related data; and
transmitting the object-related data to the central processing unit.

10. The method according to claim 9, wherein the detection of the object-related data contains an optical detection.

11. The method according to claim 9, wherein the detection of the object-related data contains a manual detection.

12. The method according to claim 9, wherein the method also contains the following step:
assigning the detected object-related data to the attached unique identification codes.

13. The method according to claim 1, wherein the number of objects form a predefined object sequence which defines a first object of the number of objects and a last object of the number of objects, wherein the unique identification codes of the number of unique identification codes are attached to the objects one after the other in a sequence corresponding to the predefined code sequence, with the result that the first unique identification code is attached to the first object and the last unique identification code is attached to the last object.

14. The method according to claim 4, wherein the method also contains the following step:
producing the set of labels such that the labels are produced one after another in the predefined label sequence.

15. The method according to claim 4, wherein the attachment of the number of labels to the number of objects comprises a gluing.

16. The method according to claim 1, wherein the attachment of the number of unique identification codes from the set of unique identification codes to the number of objects comprises a printing of the number of unique identification codes from the set of unique identification codes onto the number of objects.

17. A system for attaching a number of unique identification codes from a set of unique identification codes to a number of objects, comprising a detection unit, a central processing unit and a computer-readable medium that, when executed by the central processing unit, causes the central processing unit to perform a method comprising the following steps:
attaching the number of unique identification codes from the set of unique identification codes to the number of objects, such that one unique identification code is attached to each object;
optically detecting a first attached unique identification code and a last attached unique identification code from the set of unique identification codes with a detection unit;
detecting an item of additional information; and
inferring the attached unique identification codes based on the optically detected first attached unique identification code and the optically detected last attached unique identification code and the detected item of additional information,
wherein only the first attached unique identification code and the last attached unique identification code from the set of unique identification codes are optically detected by the detection unit.

18. A computer-readable medium that, when executed by a central processing unit, causes the central processing unit to perform a method comprising the following steps:
attaching the number of unique identification codes from the set of unique identification codes to the number of objects, such that one unique identification code is attached to each object;
optically detecting a first attached unique identification code and a last attached unique identification code from the set of unique identification codes with a detection unit;
detecting an item of additional information; and
inferring the attached unique identification codes based on the optically detected first attached unique identification code and the optically detected last attached unique identification code and the detected item of additional information,
wherein only the first attached unique identification code and the last attached unique identification code from the set of unique identification codes are optically detected by the detection unit.

* * * * *